United States Patent
Kashima et al.

[11] Patent Number: 6,118,872
[45] Date of Patent: Sep. 12, 2000

[54] APPARATUS AND METHOD FOR CONTROLLING SECRET DATA BY USING POSITIONS OF INPUT IMAGE POINTS ON AN IMAGE AND A SEQUENCE OF THE POSITIONS

[75] Inventors: Kazunori Kashima, Tokyo; Masataka Matsuura, Kawasaki, both of Japan

[73] Assignee: Fujitsu Limited, Kawasaki, Japan

[21] Appl. No.: 09/046,684

[22] Filed: Mar. 24, 1998

[30] Foreign Application Priority Data

Sep. 5, 1997 [JP] Japan ................................. 9-241408

[51] Int. Cl.⁷ .................................................. H04N 1/44
[52] U.S. Cl. ........................... 380/205; 380/54; 380/210; 713/176
[58] Field of Search ..................... 713/200, 176; 380/44, 54, 205, 207, 208, 210, 213, 215, 239, 240, 241, 242, 264, 279, 281, 286

[56] References Cited

U.S. PATENT DOCUMENTS 5,757,915 5/1998 Aucsmith et al. ........................ 380/25
5,832,119 11/1998 Rhoads ..................................... 382/232
5,960,086 9/1999 Atalla ......................................... 380/44

*Primary Examiner*—Tod R. Swann
*Assistant Examiner*—Justin T. Darrow
*Attorney, Agent, or Firm*—Staas & Halsey LLP

[57] ABSTRACT

A secret data management apparatus includes an image display unit which displays an image on a display monitor. A position/sequence input unit inputs positions of input image points on the image using an input device and inputs a sequence of the positions using the input device. An encryption unit generates encrypted data of a secret key based on the positions and the sequence from the position/sequence input unit. A secret data storage unit stores the encrypted data of the secret key from the encryption unit in a storage medium. An access allowance unit allows access to the secret key stored in the storage medium when positions of input image points on the image and a sequence of the positions, subsequently specified using the input device at a time of the access, match with the positions and the sequence from the position/sequence input unit. A decryption unit generates plain data of the secret key from the encrypted data stored in the storage medium when the access is allowed by the access allowance unit.

27 Claims, 20 Drawing Sheets

FIG. 7A

| USER CODE | CIPHER CODE | SECRET KEY A | PREVIOUS ACCESS ADDRESS | ... |
|---|---|---|---|---|

FIG. 7B

| USER CODE | USER NAME | BACKGROUND IMAGE CODE | USER ENVIRONMENT CODE | ... |
|---|---|---|---|---|

FIG. 10

| USER CODE | CIPHER CODE | SECRET KEY A | PREVIOUS ACCESS ADDRESS | . . . |
|---|---|---|---|---|
| | | SECRET KEY B | PREVIOUS ACCESS ADDRESS | |

FIG. 12

```
┌─────────────────────────────────────────────────┐
│           USER ENVIRONMENT SETTING              │
│                                                 │
│  1. USER NAME      ⇒   ┌──────────────────┐     │
│                        └──────────────────┘     │
│                                                 │
│  2. USED BROWSER   ⇒   ■ Netscape Navigater™    │
│                        ☐ Internet Exploer™      │
│                        ☐ OTHERS                 │
│                                                 │
│  3. BROWSER LINK   ⇒   ■ BROWSER LINK OPTION    │
│                        ☐ DISPLAY MONITOR ONLY   │
│                                                 │
│         [OK]      [ CANCEL ]    [ NEXT ]        │
└─────────────────────────────────────────────────┘
```

FIG. 17

AN ENCRYPTION KEY IS CREATED BY POSITIONS
OF INPUT IMAGE POINTS AND A SEQUENCE OF
POSITIONS SPECIFIED BY YOU

[OK]   [ CANCEL ]   [ BACK ]

FIG. 18

SECRET KEY SETTING

5. SECRET KEY INPUT METHOD CHOICE

☐ INPUT BY IC CARD
☐ INPUT BY FILE TRANSFER
☐ INPUT BY KEYBOARD

[OK]   [ CANCEL ]   [ BACK ]

FIG. 19

YOU ARE REQUESTED TO INPUT A USER NAME

USER NAME CHOICE ⇒ RICHARD / JAMES / WILLIAM

[OK]   [ CANCEL ]   [ BACK ]

FIG. 20

YOU ARE REQUESTED TO INPUT AN IMAGE PASSWORD

MESH PATTERN
● ON
○ OFF

RECEPTION STATUS: ■■■■□□□□□□□□□□

[OK]   [ CANCEL ]   [ BACK ]

FIG. 21

```
        YOUR IMAGE PASSWORD IS ACCEPTED

SECRET KEY        ● SECRET KEY IS TRANSMITTED BY BROWSER
TRANSMISSION      ○ SECRET KEY IS TRANSFERRED TO DISPLAY MONITOR
CHOICE            ○ SECRET KEY IS TRANSFERRED TO A FILE

[OK]      [ CANCEL ]    [ BACK ]
```

FIG. 22A

```
┌────────────────────────────────────────────────────────────┐
│ SHOPPING MALL                                    _  □  ×   │
├────────────────────────────────────────────────────────────┤
│ FILE(F)   EDIT(E)   DISPLAY(V)   MOVE(G)   FAVORITE(A)   HELP(H) │
├────────────────────────────────────────────────────────────┤
│  ⇐      ⇒     ×     □     • • •                            │
│ BACK  FORWARD CANCEL RENEW                                 │
├────────────────────────────────────────────────────────────┤
│ ADDRESS │ http://www.xyz.or.jp/       │ ▼ │ LINK           │
├────────────────────────────────────────────────────────────┤
│                                                            │
│ WE ACKNOWLEDGE WITH THANKS YOUR PURCHASE ORDER FOR ITEM A. │
│                                                            │
│ PLEASE GIVE A DIGITAL SIGNATURE WITH YOUR SECRET KEY AND   │
│ CLICK A TRANSMIT ORDER BUTTON.                             │
│                                                            │
│  ┌───────────────────┐    ┌──────────────────┐             │
│  │ PURCHASE ORDER    │    │ DIGITAL SIGNATURE│             │
│  │                   │    └──────────────────┘             │
│  │ ITEM A : 1 PIECE  │    ┌──────────────────┐             │
│  │ PRICE : ¥×××      │    │ TRANSMIT ORDER   │             │
│  └───────────────────┘    └──────────────────┘             │
│                                                            │
└────────────────────────────────────────────────────────────┘
```

FIG. 22B

```
┌──────────────────────────────────────┐
│ NOW YOU OWN SECRET KEYS ISSUED BY    │
│ FOLLOWING CERTIFICATE AUTHORITIES.   │
│                                      │
│ PLEASE SELECT ONE OF THESE KEYS      │
│ THAT YOU WANT TO USE.                │
│                                      │
│   □  ABC CREDIT                      │
│   ■  XYZ CERTIFICATE SERVICE CO.     │
│   □  PQR BANK                        │
│   •                                  │
│   •                                  │
└──────────────────────────────────────┘
```

APPARATUS AND METHOD FOR CONTROLLING SECRET DATA BY USING POSITIONS OF INPUT IMAGE POINTS ON AN IMAGE AND A SEQUENCE OF THE POSITIONS

BACKGROUND OF THE INVENTION (1) Field of the Invention

The present invention relates to a secret data management apparatus and method which controls secret data, such as a secret key which a certificate authority issues for a user. Further, the present invention relates to a computer readable medium storing program code instructions which cause a processor to execute a secret data management processing in a secret data management apparatus.

(2) Description of the Related Art

Generally, in a conventional secret data management system, an electronically stored secret key is controlled by using a password including a number of alphanumeric characters in order to avoid discovery by a hacker. It is desired for a user to make use of several different passwords when gaining access to various electronic communication services. However, it is practically difficult for the user to memorize the respective passwords for obtaining such services. In many cases, the user makes use of a single password when obtaining the services.

In a conventional system, a password based on personal information, such as a birth date or a phone number, is often input by the user. The possibility that a serious hacker discovers the password based on personal data is higher than a mathematically estimated possibility of the discovery of the password.

Further, when the user of the conventional secret data management system makes an electronic communication through the Internet, the user often inputs a password including alphanumeric characters. The user runs the risk of leakage of the password to hackers in such a case.

As described above, when a password including alphanumeric characters is used for controlling the secret key, the possibility of the discovery of the password is increased according to the manner in which the user makes use of the password.

The secret key controlled by the use of the password generally indicates a numerical value of several hundred digits. It is practically impossible for the user to memorize the numerical value of the secret key. In many cases, a storage medium, such as an IC card, in which the secret data is stored is used. When the secret key from the IC card is controlled by using the password as in the above conventional system, the possibility of the discovery of the password is increased according to the manner in which the user makes use of the password. If the IC card is stolen by a hacker, the hacker will easily discover the password to gain access to the secret data.

When the secret key is controlled by using the alphanumeric password in the conventional secret data management system, the conventional system fails to provide adequate security for the secret information in the conventional system.

A conceivable method to increase security for the secret information in the conventional system is to use an alphanumeric password including a large number of digits which is hard to discover. However, it is difficult for the user to memorize such a password, and the use of such a password is inconvenient for the user. The above-mentioned method also fails to provide adequate security for the secret information.

As described above, the user often inputs a password based on personal data pertaining to the user when gaining access to the secret information. The possibility that a serious hacker discovers the password based on the personal data is higher than the mathematically estimated possibility of the discovery of the password. The conventional secret data management system fails to provide adequate security for the secret information.

Further, when the user of the conventional secret data management system makes an electronic communication through the Internet, the user has to input a password including alphanumeric characters by operating a keyboard of a personal computer instead of a mouse. Generally, when obtaining electronic communication services, the user frequently operates the mouse. The user must operate the keyboard only when inputting the password, and therefore, the use of the alphanumeric password is considerably inconvenient for the user.

SUMMARY OF THE INVENTION

An object of the present invention is to provide an improved secret data management apparatus and secret data management method in which the above-mentioned problems are eliminated.

Another object of the present invention is to provide a secret data management apparatus which utilizes a simple image password created by positions of input image points and a sequence of the positions, arbitrarily specified by a user on a display monitor using an input device, and provides adequate security for secret information stored in a storage device.

Still another object of the present invention is to provide a secret data management method which utilizes a simple image password created by positions of input image points and a sequence of the positions, arbitrarily specified by a user on a display monitor using an input device only, and provides adequate security for secret information stored in a storage device.

A further object of the present invention is to provide a computer readable medium storing program code instructions for causing a processor of a secret data management apparatus to execute a secret data management processing which utilizes a simple image password created by positions of input image points and a sequence of the positions, arbitrarily specified by a user on a display monitor using an input device, and provides adequate security for secret information stored in a storage device.

The above-mentioned objects of the present invention are achieved by a secret data management apparatus for controlling a secret key so that the secret key is kept confidential, the secret data management apparatus comprising: an image display unit which displays an image on a display monitor; a position/sequence input unit which inputs positions of input image points on the image specified using an input device and inputs a sequence of the positions specified using the input device; an encryption unit which generates encrypted data of the secret key based on the positions and the sequence from the position/sequence input unit; a secret data storage unit which stores the encrypted data of the secret key from the encryption unit in a storage medium; an access allowance unit which allows an access to the secret key stored in the storage medium when positions of input image points on the image and a sequence of the positions, subsequently specified using the input device at a time of the access, match with the positions and the sequence from the position/sequence input unit; and a decryption unit which generates plain data of the secret key from the encrypted data stored in the storage medium when the access is allowed by the access allowance unit.

The above-mentioned objects of the present invention are achieved by a secret data management apparatus for controlling a secret key issued by a certificate authority so that the secret key is kept confidential, the secret data management apparatus comprising: an image display unit which displays an image on a display monitor; a position/sequence input unit which inputs positions of input image points on the image specified using an input device and inputs a sequence of the positions specified using the input device; an encryption unit which generates encrypted data of the secret key based on the positions and the sequence from the position/sequence input unit; a secret data storage unit which stores the encrypted data of the secret key from the encryption unit in a first storage medium; an access allowance unit which allows an access to the secret key stored in the first storage medium when positions of input image points on the image and a sequence of the positions, subsequently specified using the input device at a time of the access, match with the positions and the sequence from the position/sequence input unit; and a decryption unit which generates plain data of the secret key from the encrypted data stored in the first storage medium when the access is allowed by the access allowance unit.

The above-mentioned objects of the present invention are achieved by a method of controlling a secret key issued by a certificate authority so that the secret key is kept confidential, the method comprising the steps of: inputting user data and user environment data specified by a user; setting an image to be displayed on a display monitor; displaying the image on the display monitor and inputting positions of input image points on the displayed image specified by the user and a sequence of the positions specified by the user; generating an encryption key based on the specified positions and the specified sequence; generating encrypted data of the secret key based on the encryption key; and storing the encrypted data of the secret key, the user data and the user environment data in a storage medium, wherein the encrypted data, the user data, and the user environment data are related to each other, and the encrypted data, the user data, and the user environment data are registered in the storage medium.

The above-mentioned objects of the present invention are achieved by a computer readable medium storing program code for causing a processor to execute a secret data processing which controls a secret key issued by a certificate authority so that the secret key is kept confidential in a secret data management apparatus, comprising: a first program code device which causes the processor to display an image on a display monitor; a second program code device which causes the processor to input positions of input image points on the image specified using an input device and input a sequence of the positions specified using the input device; a third program code device which causes the processor to generate encrypted data of the secret key based on the positions and the sequence from the second program code device; a fourth program code device which causes the processor to store the encrypted data of the secret key from the third program code device in a first storage medium; a fifth program code device which causes the processor to allow an access to the secret key stored in the first storage medium when positions of input image points on the image and a sequence of the positions, subsequently specified using the input device at a time of the access, match with the positions and the sequence from the second program code device; and a sixth program code device which causes the processor to generate plain data of the secret key from the encrypted data stored in the first storage medium when the access is allowed.

In the secret data management apparatus and method of the present invention, the encryption key is created by positions of input image points and a sequence of the positions, specified by a user on the display monitor using only the input device, and the secret key is controlled by using the encryption key. It is no longer necessary to input the alphanumeric password by using the keyboard, as in the conventional system. It is possible for the present invention to provide increased operability for the user and adequate security for the secret information in the storage medium.

According to the present invention, it is not necessary to use the personal-data password such as a date of birth or a phone number. The positions of the input image points and the sequence of the positions are arbitrarily specified by the user on the display monitor using the input device and does not rely on personal data. It is possible for the present invention to provide adequate security for the secret information, and the secret data management apparatus and method of the present invention are effective in avoiding the discovery of the password by a hacker.

Further, when the user of the secret data management apparatus of the present invention makes an electronic communication through the Internet, it is not necessary for the user to operate the keyboard of the computer during the communication. The positions of the input image points and the sequence of the positions can be specified by the user on the display monitor using only the input device, and it is possible for the present invention to provide increased operability for the user and adequate security for the secret information.

Further, the secret data management apparatus and method of the present invention does not require expensive hardware, such as a fingerprint system or a voice pattern system, to authenticate personal identification, and can be constructed by implementing software only.

BRIEF DESCRIPTION OF THE DRAWINGS

The above and other objects, features and advantages of the present invention will become more apparent from the following detailed description when read in conjunction with the accompanying drawings in which:

FIG. 7A and FIG. 7B are diagrams for explaining the contents of a secret key database and a user environment setting database in the secret data management apparatus of FIG. 5;

FIG. 10 is a diagram for explaining the contents of the secret key database after the additional entry processing is performed;

FIG. 12 is a diagram for explaining a display screen of the secret data management apparatus of FIG. 5 at a user environment setting step;

FIG. 17 is a diagram for explaining a display screen of the secret data management apparatus of FIG. 5 at an encryption key generating step;

FIG. 18 is a diagram for explaining a display screen of the secret data management apparatus of FIG. 5 at a secret key setting step;

FIG. 19 is a diagram for explaining a display screen of the secret data management apparatus of FIG. 5 at a registered user name setting step;

FIG. 20 is a diagram for explaining a display screen of the secret data management apparatus of FIG. 5 at a background/pattern display step;

FIG. 21 is a diagram for explaining a display screen of the secret data management apparatus of FIG. 5 at an image password reception step; and FIG. 22A and FIG. 22B are diagrams for explaining display screens of a browser when a browser link option is used.

DETAILED DESCRIPTION OF THE PREFERRED EMBODIMENT

To facilitate understanding of the present invention, a description will be given of the principles of a secret data management apparatus and method of the present invention with reference to FIG. 1 through FIG. 4.

Figure 1:
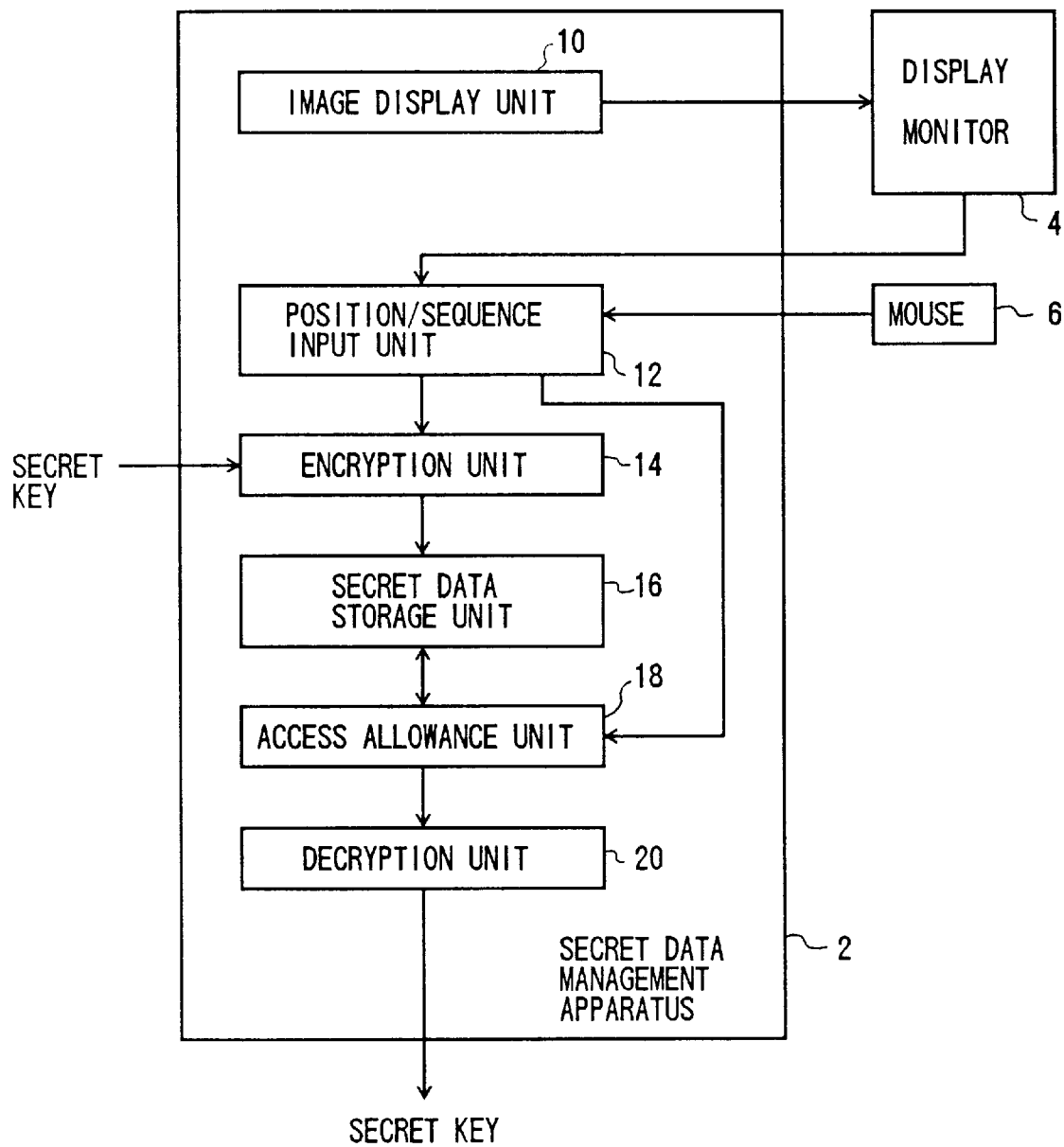
FIG. 1 is a block diagram of basic elements of a secret data management apparatus of the present invention.

FIG. 1 shows basic elements of a secret data management apparatus of the present invention in which a secret key is controlled so that the secret key is kept confidential.

As shown in FIG. 1, a secret data management apparatus 2 comprises an image display unit which displays an image on a display monitor 4. A position/sequence input unit 12 inputs positions of input image points on the image specified by a user by using a mouse 6, and inputs a sequence of the positions specified by using the mouse 6. The mouse 6 in the secret data management apparatus 2 may be any one of input devices including a pointing device, a trackball, a joystick, and so on. An encryption unit 14 generates encrypted data of a secret key based on the positions and the sequence from the position/sequence input unit 12. A secret data storage unit 16 stores the encrypted data of the secret key from the encryption unit 14 in a storage medium (not shown in FIG. 1).

Further, in the secret data management apparatus 2, an access allowance unit 18 allows access to the secret key in the storage medium when positions of input image points on the image and a sequence of the positions, subsequently specified by the user by using the mouse 6 at a time of access, match with the positions and the sequence from the position/sequence input unit 12. A decryption unit 20 generates plain data of the secret key from the encrypted data stored in the storage medium when access is allowed by the access allowance unit 18.

In the above-described secret data management apparatus 2, access to the secret key in the storage medium is controlled by using the positions and the sequence on the image specified by the user on the display monitor 4 by using the mouse 6. The access to the secret key is allowed only when the subsequently specified positions and sequence (or the image password) match with the originally specified positions and sequence (or the image password). As the image password can arbitrarily be specified by the user and does not rely on personal data as in the conventional system, the secret data management apparatus of the present invention can provide increased operability for the user and adequate security for the secret key in the storage medium. It is possible for the secret data management apparatus of the present invention to remarkably reduce the possibility that a hacker will discover the image password, as compared to the case of alphanumeric password of the conventional system.

In the secret data management apparatus 2 of FIG. 1, the encryption unit 14 may include an encryption key generating unit which generates an encryption key based on the positions and the sequence from the position/sequence input unit 12, and a secret key encryption unit which generates encrypted data of the secret key based on the encryption key from the encryption key generating unit.

In the above-described secret data management apparatus 2, the secret key is controlled by using an encryption key created by the positions of the input image points and the sequence of the positions specified by the user, and the encrypted data of the secret key is stored in the storage medium. The secret data management apparatus of the present invention can provide a higher security for the secret information than the conventional system in which the plaintext of the secret key is stored in the storage medium.

Further, in the encryption unit 14 of the secret data management apparatus 2 of FIG. 1, the encryption key generating unit may calculate a value of the encryption key based on the positions and the sequence from the position/sequence input unit 12. The secret key encryption unit may perform a one-to-one letter substitution of an input secret key according to the calculated value from the encryption key generating unit.

The above-described secret data management apparatus 2 can remarkably reduce the possibility that a hacker discovers the image password in comparison with the case of the alphanumeric password as in the conventional system.

Figure 2:
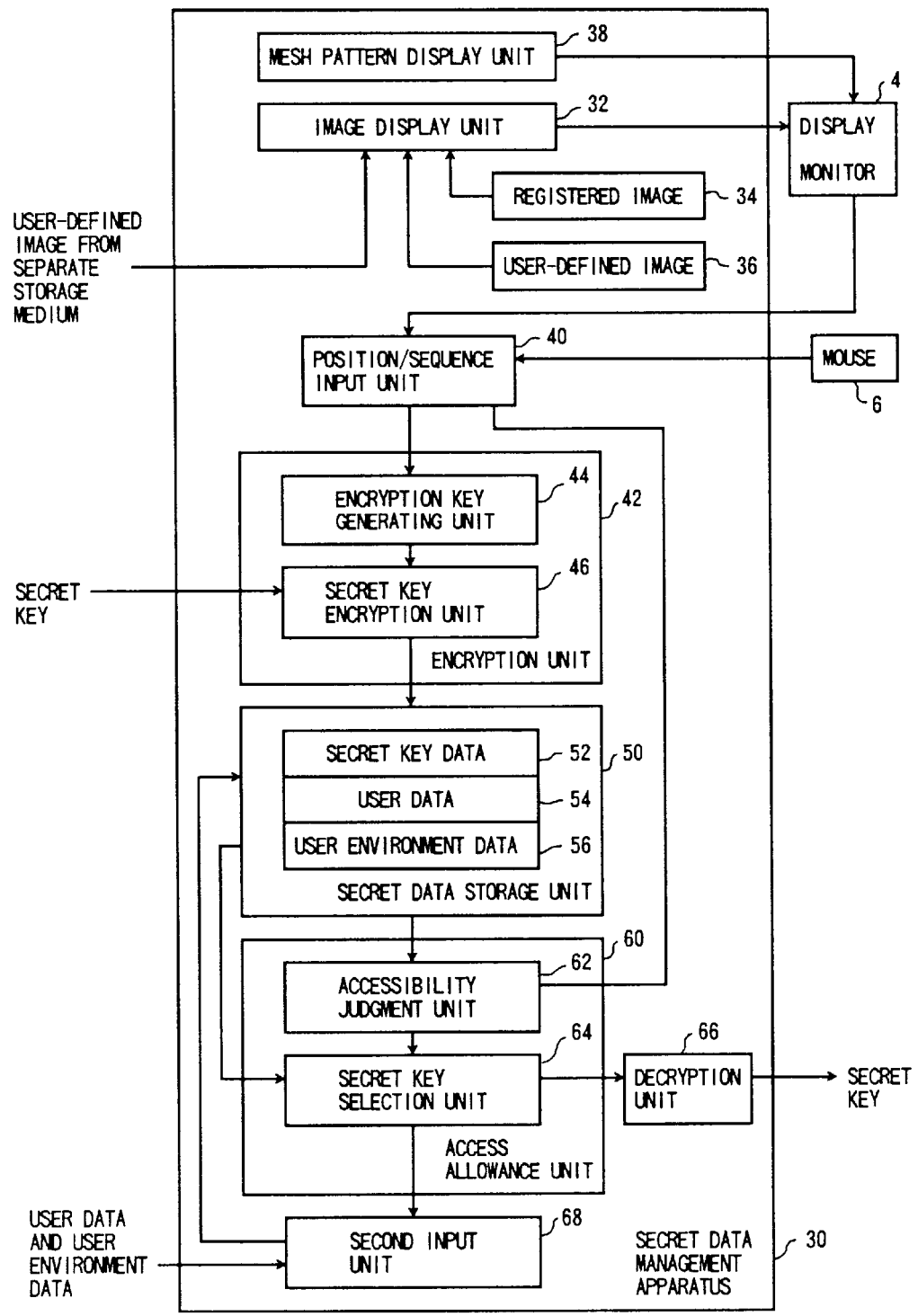
FIG. 2 is a block diagram of the secret data management apparatus of the present invention.

Further, in the secret data management apparatus 2 of FIG. 2, the image display unit 10 may display a mesh pattern superimposed on the image on the display monitor 4, the mesh pattern having a selectable mesh size and a selectable mesh pattern color. The above-described secret data management apparatus 2 can provide increased operability for the user when specifying the positions of the input image points and the sequence of the positions on the image on the display monitor 4.

FIG. 2 shows a configuration of the secret data management apparatus of the present invention. In the secret data management apparatus of FIG. 2, a secret key issued by a certificate authority is controlled so that the secret key is kept confidential.

In FIG. 2, the elements which are the same as corresponding elements in FIG. 1 are designated by the same reference numerals, and a description thereof will be omitted.

As shown in FIG. 2, a secret data management apparatus 30 comprises an image display unit 32 which displays an image on the display monitor 4. A position/sequence input unit 40 inputs positions of input image points on the image specified by a user on the display monitor 4 by using the mouse 6, and inputs a sequence of the positions specified by the user on the display monitor 4 by using the mouse 6. An encryption unit 42 generates encrypted data of the secret key from the certificate authority based on the positions and the sequence from the position/sequence input unit 40. A secret data storage unit 50 stores the encrypted data of the secret key from the encryption unit 42 in a storage medium (not shown).

Further, in the secret data management apparatus 30 of FIG. 2, an access allowance unit 60 allows access to the secret key stored in the storage medium when positions of input image points on the image and a sequence of the positions, subsequently specified by the user on the display monitor 4 by using the mouse 6 at a time of the access, match with the positions and the sequence from the position/sequence input unit 40. A decryption unit 66 generates plain data of the secret key from the encrypted data stored in the storage medium when the access is allowed by the access allowance unit 60.

In the secret data management apparatus 30 of FIG. 2, the encryption unit 42 comprises an encryption key generating unit 44 which generates an encryption key based on the positions and the sequence from the position/sequence input unit 40, and a secret key encryption unit 46 which generates encrypted data of the secret key based on the encryption key from the encryption key generating unit 44.

In the above-described encryption unit 42 of the secret data management apparatus 30, the encryption key generating unit 44 calculates a value of the encryption key based on the positions and the sequence from the position/sequence input unit 40. The secret key encryption unit 46 performs a one-to-one letter substitution of the secret key from the certificate authority according to the calculated value from the encryption key generating unit 44.

In the secret data management apparatus 30 of FIG. 2, the image display unit 32 displays a registered image 34 on the display monitor 4. In the above-described secret data management apparatus 30, the image display unit 32 may display a user-defined image 36 on the display monitor 4. Further, in the above-described secret data management apparatus 30, the image display unit 32 may display a user-defined image, transferred from a separate storage medium, on the display monitor 4. This storage medium is separated from the storage medium within the secret data management apparatus 30. This enables the secret data management apparatus of the present invention to provide increased security for the image password specified by the user.

The secret data management apparatus 30 of FIG. 2 further comprises a mesh pattern display unit 38 which displays a mesh pattern superimposed on the image on the display monitor 4, the mesh pattern having a selectable mesh size and a selectable mesh pattern color.

In the secret data management apparatus 30 of FIG. 2, the encryption unit 42 may generate encrypted data of plural secret keys when identical positions of input image points on the image and an identical sequence of the positions are specified by the user on the display monitor 4 by using the mouse 6 and input by the position/sequence input unit 40. In this case, the access allowance unit 60 may allow access to the plural secret keys when the identical positions and the identical sequence are subsequently specified by the user on the display monitor 4 by using the mouse 6 at a time of the access. In this case, when the user specifies, at a time of access to the plural secret keys, the identical positions and the identical sequence on the display monitor 4 by using the mouse 6, the access allowance unit 60 can allow the access to the plural secret keys.

The secret data management apparatus 30 of FIG. 2 further comprises a second input unit 68 which inputs user data and user environment data specified by the user. As shown in FIG. 2, the secret data storage unit 50 stores the user data 54 and the user environment data 56 in the storage medium in addition to the encrypted data 52 of the secret key.

In the above-described secret data management apparatus 30, the access allowance unit 60 comprises an accessibility judgment unit 62 which determines whether positions of input image points on the image and a sequence of the positions, subsequently specified by the user on the display monitor 4 by using the mouse 6 at a time of the access, match with the positions and the sequence from the position/sequence input unit 40, and a secret key selection unit 64 which reads the user data 54 and the user environment data 56, in addition to the encrypted data 52 of the secret key, from the storage medium when the access to the secret key is allowed by the access allowance unit 60. This enables the secret data management apparatus of the present invention to provide increased operability for the user.

Figure 3:
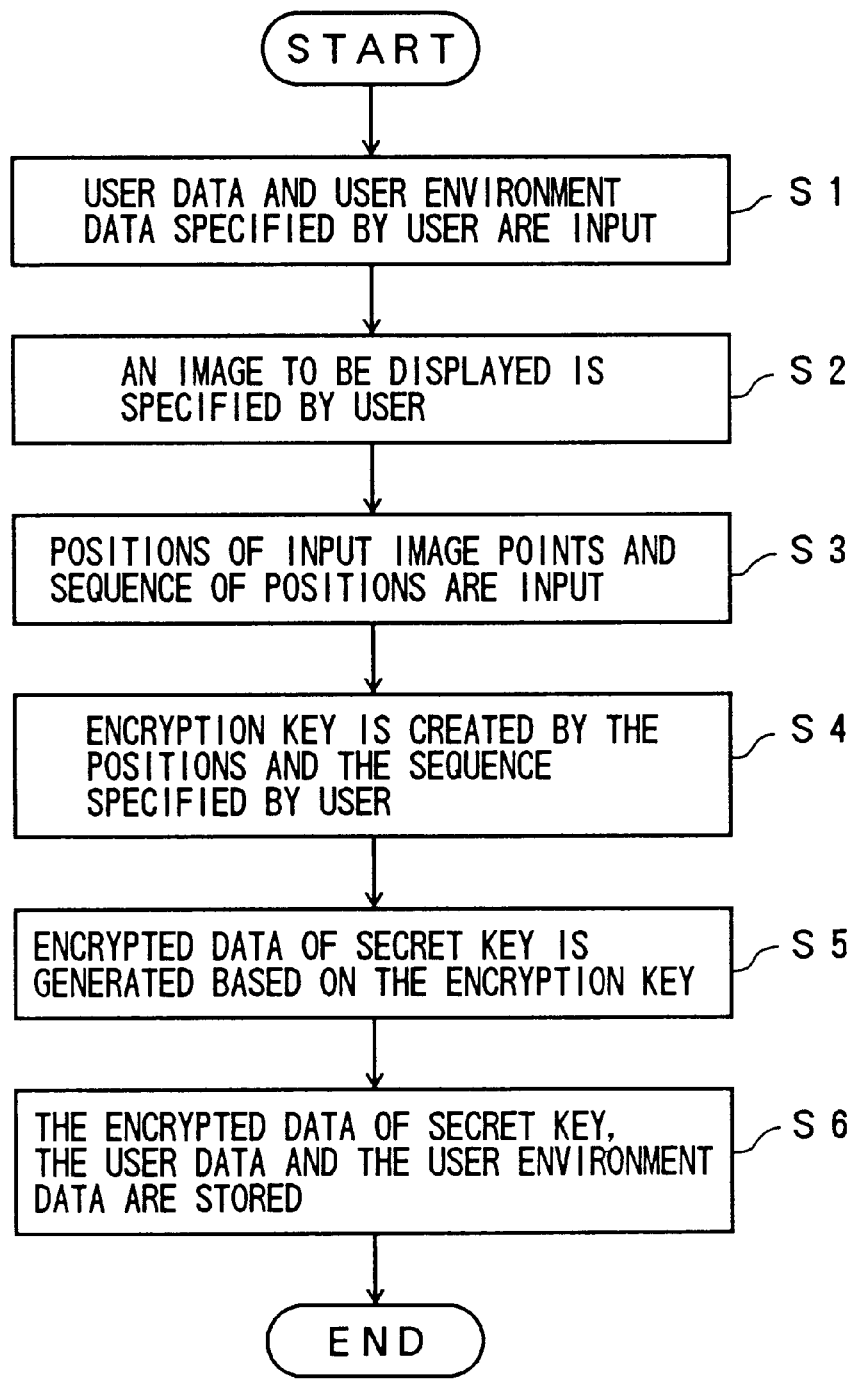
FIG. 3 is a flowchart for explaining a secret key entry processing of a secret data management method of the present invention.

FIG. 3 shows a secret key entry processing of a secret data management method of the present invention. In the secret data management method of FIG. 3, a secret key issued by a certificate authority is controlled by using an encryption key created by positions of input image points and a sequence of the positions specified by a user, so that the secret key is kept confidential.

The secret data management method of FIG. 3 relates to the secret key entry processing. As shown in FIG. 3, at the start of the secret key entry processing of the secret data management method of the present invention, user data and user environment data specified by a user are input to the secret data management apparatus (S1). An image to be displayed on the display monitor is specified by the user (S2). The image is displayed on the display monitor, and positions of input image points of the image on the display monitor, specified by the user by using the mouse, and a sequence of the positions specified by the user are input to the secret data management apparatus (S3).

Further, in the secret key entry processing, an encryption key is generated based on the specified positions and the specified sequence (S4). Encrypted data of the secret key is generated based on the encryption key (S5). The encrypted data of the secret key, the user data and the user environment data are stored in a storage medium of the secret data management apparatus (S6). In the storage medium, the encrypted data, the user data, and the user environment data are related to each other, and the encrypted data, the user data, and the user environment data are registered in the storage medium (S6).

Figure 4:
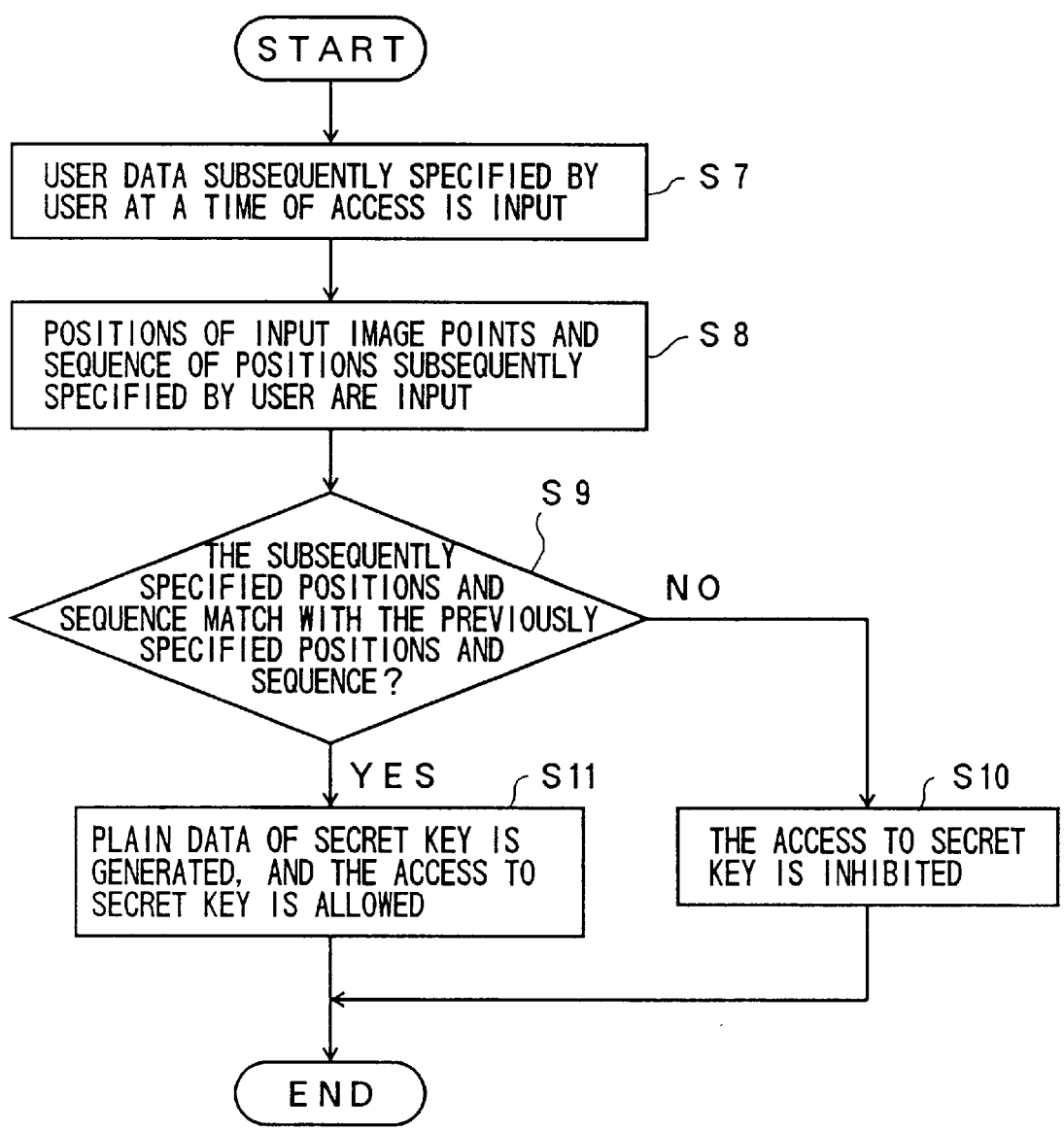
FIG. 4 is a flowchart for explaining a user authentication processing of the secret data management method of the present invention.

FIG. 4 shows a user authentication processing of the secret data management method of the present invention. In the secret data management method of FIG. 4, access to the secret key issued by the certificate authority is controlled by performing a user authentication after the secret key entry processing of FIG. 3 is finished.

As shown in FIG. 4, at the start of the user authentication processing of the secret data management method of the present invention, the user data subsequently specified by the user at a time of access is input to the secret data management apparatus (S7). The image is displayed on the display monitor, and positions of input image points on the image on the display monitor subsequently specified by the user and a sequence of the positions subsequently specified by the user are input to the secret data management apparatus (S8).

After the above step S8 is performed, a determination is made as to whether the subsequently specified positions and sequence of the image password match with the previously specified positions and sequence of the image password (S9).

When the above determination step S9 yields the match, plain data of the secret key related to the user name is generated from the encrypted data stored in the storage medium, and access to the secret key is allowed in accordance with the user environment data related to the secret key (S11).

On the other hand, when the above determination step S9 does not yield the match, the access to the secret key is inhibited (S10). Accordingly, the secret data management method of the present invention can provide increased operability for the user and adequate security for the secret information.

In view of the above-described secret data management apparatus and method, a description will now be given of the preferred embodiment of the secret data management apparatus of the present invention with reference to FIG. 5 through FIG. 22B.

Figure 5:
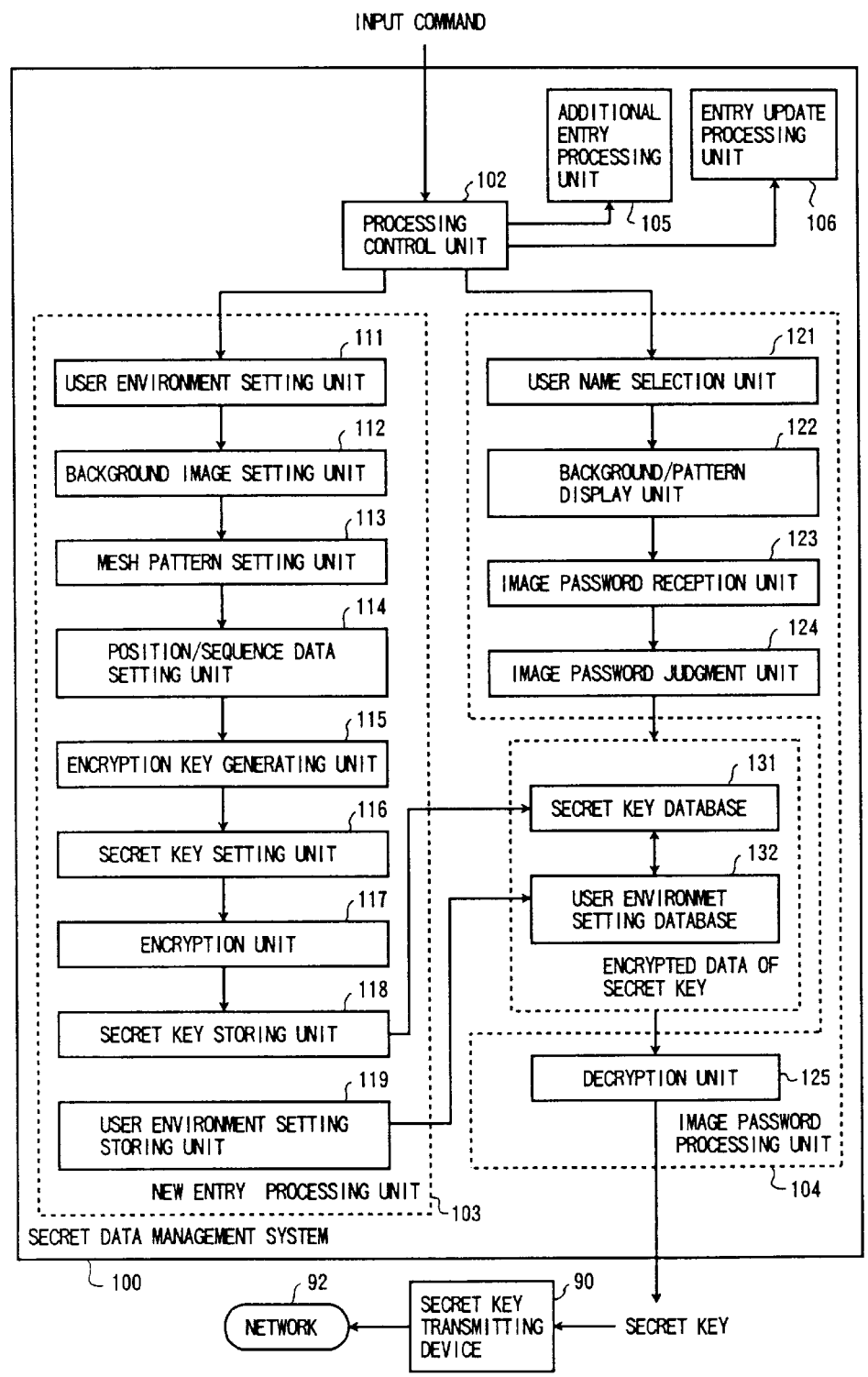
FIG. 5 is a block diagram for explaining a preferred embodiment of the secret data management apparatus of the present invention.

FIG. 5 shows an embodiment of the secret data management apparatus of the present invention.

In a secret data management system 100 of the present embodiment, a secret key to obtaining access to secret information stored in a storage medium is generated by using an encryption key created by positions of input image points and a sequence of the positions. The positions of the input image points and the sequence of the positions are arbitrarily specified by the image password user on the display monitor with the mouse. The secret data management system 100 controls access to the secret information by performing a determination as to whether an input image password given for the access accords with a registered image password (or the positions of the input image points and the sequence of the positions) which is stored within the system 100.

As shown in FIG. 5, the secret data management system 100 comprises a processing control unit 102. In response to an input command, the processing control unit 102 selects one of a plurality of processing units within the secret data management system 100, and performs a corresponding processing for the selected one of the plurality of processing units. The plurality of processing units include a new entry processing unit 103, an image password processing unit 104, an additional entry processing unit 105, and an entry update processing unit 106.

Further, in the secret data management system 100 of FIG. 5, a secret key database 131 and a user environment database 132 are provided. In the secret key database 131, a plurality of secret key data are stored. In the user environment database 132, a plurality of user environment setting data are stored.

In the new entry processing unit 103 of the system 100 of FIG. 5, a user environment setting unit 111, a background image setting unit 112, a mesh pattern setting unit 113, a position/sequence data setting unit 114, an encryption key generating unit 115, a secret key setting unit 116, an encryption unit 117, a secret key storing unit 118, and a user environment setting storing unit 119 are provided.

Figure 6:
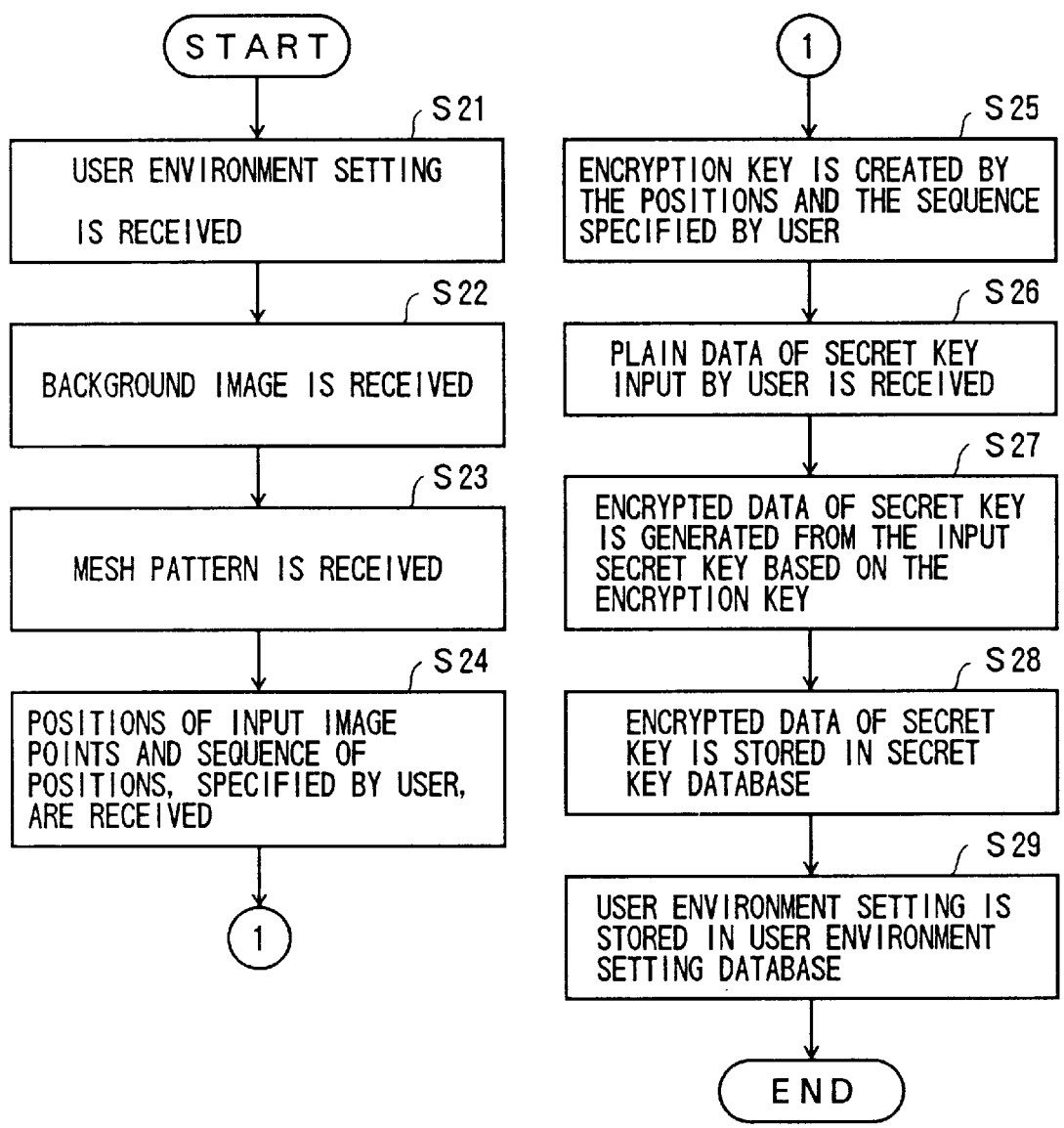
FIG. 6 is a flowchart for explaining a new entry processing performed by the secret data management apparatus of FIG. 5.

FIG. 6 shows a new entry processing performed by the new entry processing unit 103 in the secret data management system 100.

In the present embodiment, a new entry processing program related to the flowchart of FIG. 6 (which will be described later) is program code instructions stored in a memory (not shown) of the secret data management system 100. The memory of the secret data management system 100 is, for example, a ROM (read-only memory) or a RAM (random access memory). The memory corresponds to a computer readable medium in the claims. The computer readable medium includes any instruction storage device, such as for examples, magnetic disks including floppy disks, optical disks including CD-ROMs, magneto-optical disks including MOs, semiconductor memory cards such as IC cards and miniature cards and other types of computer usable devices and media.

In the present embodiment, the memory of the secret data management system 100 may store encoded or non-encoded instructions. The instructions may be installed from a floppy disk (or a CD-ROM) to a hard disk drive (not shown) of the secret data management system 100 first, transferred to a RAM (not shown) of the system 100 and then read by a processor (not shown) of the system 100. The memory of the secret data management system 100 may store either all or a part of the instructions related to the flowchart of FIG. 6.

Further, in the present embodiment, the processing control unit 102 includes a processor (for example, a central processing unit of the secret data management system 100). The above-mentioned program code instructions cause the processor of the processing control unit 102 to perform a corresponding processing for the selected one of the processing units 103–106. Hereinafter, the processor of the processing control unit 102 of the secret data management system 100 will simply be called the processor, for the sake of simplicity of description.

During the new entry processing of FIG. 6, a secret key entry in the secret key database 131 and a user environment setting entry, related to the secret key entry, in the user environment setting database 132 are carried out by the image password user.

At the start of the new entry processing of FIG. 6, the user environment setting unit 111 at step S21 causes the processor to receive a user environment setting for the secret data management system 100 which is input by the user on the display monitor using the mouse. The environment setting input by the user includes a user name, a used browser, and a browser link option. The input environment setting for the system 100 is used during a subsequent processing of the new entry processing unit 103, in order to provide increased operability for the user.

If a registered user name is input at the above step S21 as the user name of the environment setting, the registered user name can be used during a subsequent processing of the new entry processing unit 103. The registered user name may be any identification data to identify the user, and it may not necessarily be the real name of the user. It is necessary that the identification data does not easily allow a hacker to recognize the user.

The environment setting for the system 100 is arbitrarily input by the user at the above step S21, and it is possible to provide increased operability of the mouse for the user during the subsequent processing of the new entry processing unit 103.

After the above step S21 is performed, the background image setting unit 112 at step S22 causes the processor to receive a background image input by the user. The input background image is displayed on the display monitor after the above step S22 is performed during the new entry processing.

At the above step S22, the user selects, as the input background image, one of a number of registered background images, a user-defined background image, and another background image transferred from an external image storage medium into the system 100. The image storage medium includes any image storage device, such as for examples, magnetic disks including floppy disks, optical disks including CD-ROMs, magneto-optical disks including MOs, semiconductor memory cards such as IC cards and miniature cards and other types of computer usable devices and media.

After the above step S22 is performed, the mesh pattern setting unit 113 at step S23 causes the processor to receive a mesh pattern input by the user. The input mesh pattern is superimposed on the background image on the display monitor during the subsequent processing of the new entry processing unit 103.

Positions of input image points specified by the user on the display monitor with the mouse during the image password processing may not be sensitive enough for the system 100 to recognize. The mesh pattern superimposed on the background image allows the system 100 to recognize the respective positions of input image points specified by the user with increased accuracy.

After the above step S23 is performed, the position/sequence data setting unit 114 at step S24 causes the processor to receive positions of input image points and a sequence of the positions specified by the user on the display monitor with the mouse. As described above, the background image on which the mesh pattern is superimposed is displayed on the display monitor, and the user specifies the positions of the input image points on the background image by using the mouse. The number of the input image points specified by the user corresponds to the number of digits of the image password.

After the above step S24 is performed, the encryption key generating unit 115 at step S25 causes the processor to create an encryption key based on the specified positions of the input image points and the specified sequence of the positions, which have been obtained at the above step S24. The encryption key obtained at the above step S25 is a specific numerical value, and the numerical value of the encryption key is calculated based on the specified positions and the specified sequence obtained at the above step S24.

After the above step S25 is performed, the secret key setting unit 116 at step S26 causes the processor to receive plain data (a numerical value) of a secret key input by the user. In the present embodiment, an IC card in which the plain data of the input secret key is stored may be inserted in the system 100 in order to input the plain data of the secret key to the system 100. If the input of the secret key data is performed with the IC card at a time, inserting the IC card in the system 100 at subsequent times can be omitted.

After the above step S26 is performed, the encryption unit 117 at step S27 causes the processor to generate encrypted data of the input secret key based on the encryption key which has been obtained at the above step S25. In the present embodiment, at the above step S27, a DES (data encryption standard) algorithm is used to generate encrypted data of the input secret key based on the encryption key.

After the above step S27 is performed, the secret key storing unit 118 at step S28 causes the processor to store the encrypted data of the secret key, which has been obtained at the above step S27, in the secret key database 131 of the system 100. In the secret key database 131, the registered image password (or the positions of the input image points and the sequence of the positions specified by the user with respect to the corresponding encryption key for the secret key) is stored in connection with the encrypted data of the secret key.

After the above step S28 is performed, the user environment setting storing unit 119 at step S29 causes the processor to store the user environment setting, which has been received at the above steps S21–S28, in the user environment setting database 132 of the system 100.

FIG. 7A and FIG. 7B show the contents of the secret key database 131 and the user environment setting database 132 after the new entry processing of FIG. 6 is performed.

A user code, as indicated in FIGS. 7A and 7B, is a code to identify the user who has carried out the new entry processing of FIG. 6. For a specified user, a specified user code is commonly allocated for the secret key database 131 and the user environment setting database 132.

A user name, as indicated in FIG. 7B, is the same as the input user name which has been obtained at the above step S21. A background image code, as indicated in FIG. 7B, is a code to specify the input background image which has been obtained at the above step S22.

A secret key A, as indicated in FIG. 7A, indicates the encrypted data of the secret key which has been stored at the above step S 28. As described above, the encrypted data of the secret key, generated at the above step S27, is stored in the secret key database 131.

A cipher code, as indicated in FIG. 7A, is a data item used to decrypt the encrypted data into the plain data of the secret key. Specifically, the cipher code is calculated as a difference between the plain data (the numerical value) of the secret key and the encrypted data (the numerical value) of the secret key.

A user environment code, as indicated in FIG. 7B, is a code to indicate the user environment setting, such as the used browser, which has been obtained at the above step S21. The user environment code is read from the user environment setting database 132 during a processing performed by the image password processing unit 104.

A previous access address, as indicated in FIG. 7A, is an address of a destination communication service to which the secret key from the secret key database 131 is previously transmitted by the secret key processing unit 104 or the used browser.

In the image password processing unit 104 of the system 100 of FIG. 5, a user name selection unit 121, a background/pattern display unit 122, an image password reception unit 123, an image password judgment unit 124, and a decryption unit 125 are provided.

Figure 8:
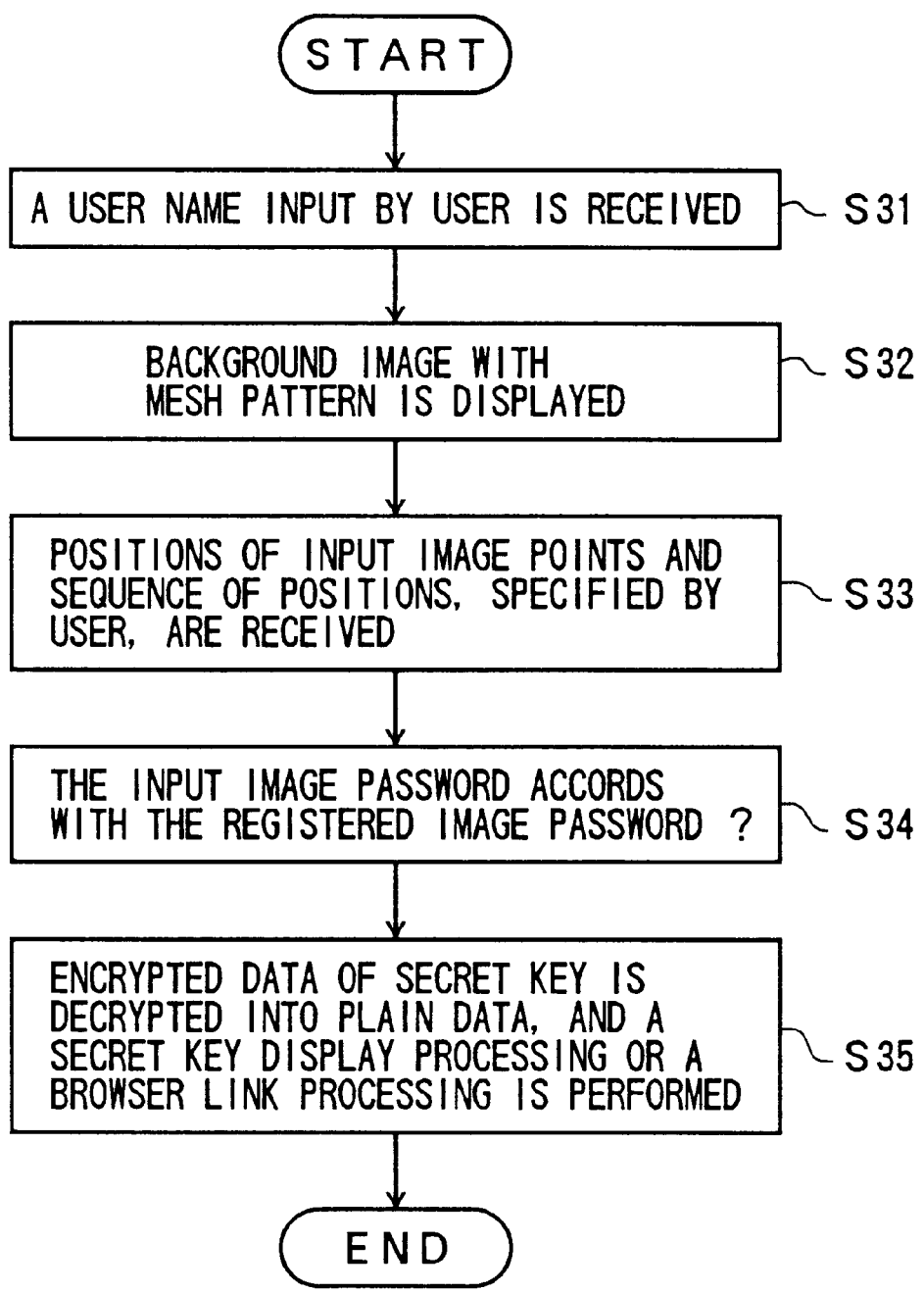
FIG. 8 is a flowchart for explaining an image password processing performed by the secret data management apparatus of FIG. 5.

FIG. 8 shows an image password processing performed by the image password processing unit 104 in the secret data management system 100.

In the present embodiment, an image password processing program related to the flowchart of FIG. 8 (which will be described later) is program code instructions stored in the memory of the secret data management system 100. The memory corresponds to a computer readable medium in the claims. The computer readable medium includes any instruction storage device, such as for examples, magnetic disks including floppy disks, optical disks including CD-ROMs, magneto-optical disks including MOs, semiconductor memory cards such as IC cards and miniature cards and other types of computer usable devices and media.

In the present embodiment, the memory of the secret data management system 100 may store encoded or non-encoded instructions. The instructions may be installed from a floppy disk (or a CD-ROM) to the hard disk drive of the secret data management system 100 first, transferred to the RAM of the system 100 and then read by the processor of the system 100. The memory of the secret data management system 100 may store either all or a part of the instructions related to the flowchart of FIG. 8.

During the image password processing of FIG. 8, an authentication of the user for the image password is carried out by the user on the display monitor by using only the mouse.

At the start of the image password processing of FIG. 8, the user name selection unit 121 at step S31 causes the processor to display a list of registered user names, which are stored in the user environment setting database 132 by the new entry processing unit 103, on the display monitor, and prompts the user to input a desired user name with the mouse.

After the above step S31 is performed, the background/pattern display unit 122 at step S32 causes the processor to display the background image with the mesh pattern superimposed, which is stored in the user environment setting database 132 by the new entry processing unit 103, on the display monitor. The background image with the mesh pattern, displayed at the above step S32, is related to the input user name within the user environment setting database 132 as shown in FIG. 7B.

After the above step S32 is performed, the image password reception unit 123 at step S33 causes the processor to prompt the user to input an image password on the display monitor with the mouse, and receive positions of input image points and a sequence of the positions currently specified by the user. When the user clicks a specific point on the background image with the mesh pattern, a color or a dot pattern of the display monitor at the point changes. The positions of the input image points on the background image are given to the user in visual form, and the user can confirm the input image password on the display monitor.

After the above step S33 is performed, the image password judgment unit 124 at step S34 causes the processor to determine whether the input image password, which has been obtained at the above step S33, accords with the registered image password which is stored in the secret key database 131 by the new entry processing unit 103.

When the result of the above step S34 is affirmative, the decryption unit 125 at step S35 causes the processor to decrypt the encrypted data of the secret key, read from the secret key database 131, into the plain data. Further, the decryption unit 125 at step S35 causes the processor to read the user environment code from the user environment setting database 132, and perform either a secret key display processing or a browser link processing according to the content of the user environment code. When the browser link processing is performed, the decryption unit 125 at step S35 causes the processor to read the previous access address from the secret key database 131, and set an address of a destination communication service to which the browser currently transmits the plain data of the secret key, by the previous access address.

When the result of the above step S34 is negative, the image password processing unit 104 causes the processor to output an error message indicating that the input image password is invalid.

Figure 9:
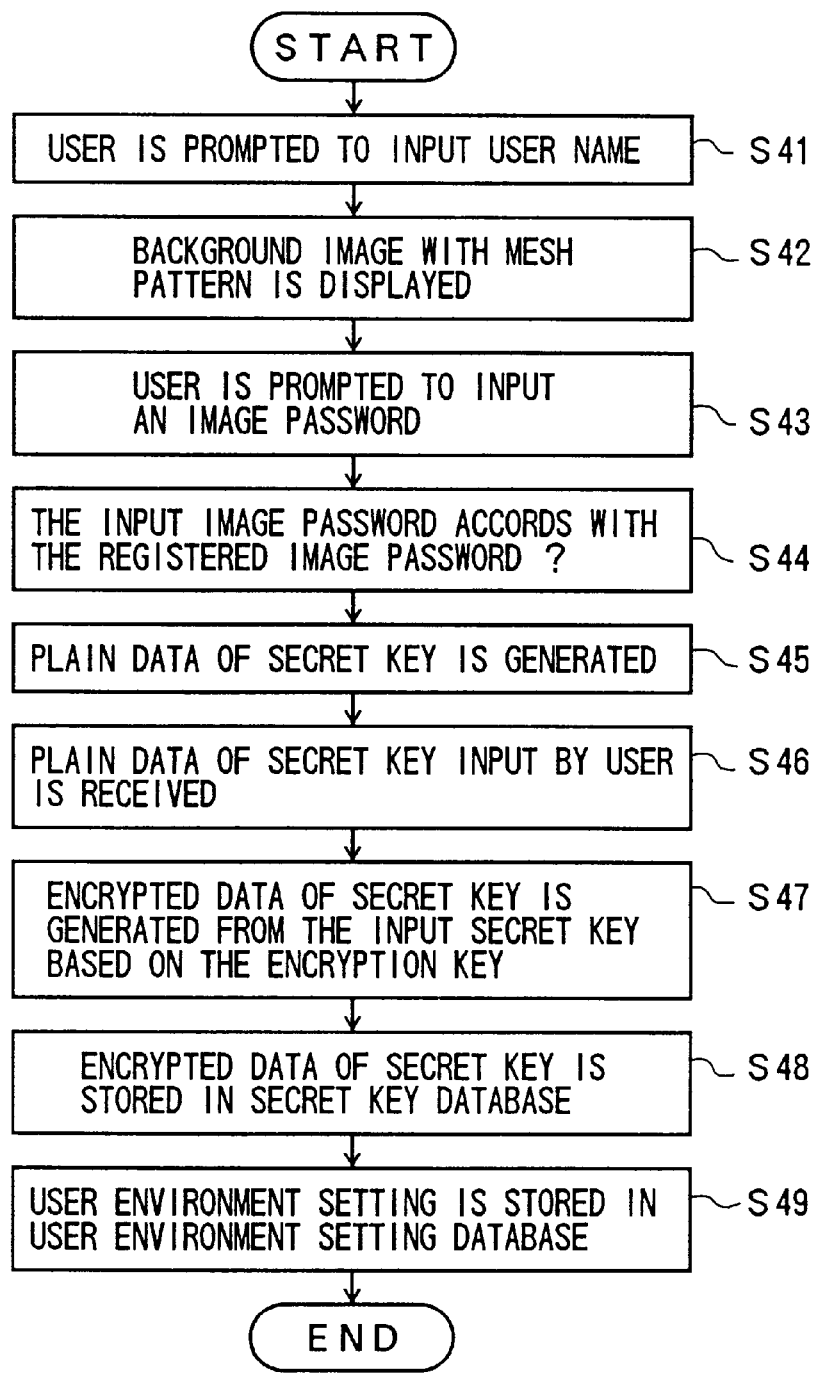
FIG. 9 is a flowchart for explaining an additional entry processing performed by the secret data management apparatus of FIG. 5.

FIG. 9 shows an additional entry processing performed by the additional entry processing unit 105 in the secret data management system 100.

In the present embodiment, an additional entry processing program related to the flowchart of FIG. 9 (which will be described later) is program code instructions stored in the memory of the secret data management system 100. The memory corresponds to a computer readable medium in the claims. The computer readable medium includes any instruction storage device, such as for examples, magnetic disks including floppy disks, optical disks including CD-ROMs, magneto-optical disks including MOs, semiconductor memory cards such as IC cards and miniature cards and other types of computer usable devices and media.

In the present embodiment, the memory of the secret data management system 100 may store encoded or non-encoded instructions. The instructions may be installed from a floppy disk (or a CD-ROM) to the hard disk drive of the secret data management system 100 first, transferred to the RAM of the system 100 and then read by the processor of the system 100. The memory of the secret data management system 100 may store either all or a part of the instructions related to the flowchart of FIG. 9.

During the additional entry processing of FIG. 9, an additional secret key entry into the secret key database 131 and an additional user environment setting entry, related to the secret key entry, into the user environment setting database 132 are carried out by the image password user.

At the start of the additional entry processing of FIG. 9, the additional entry processing unit 105 at step S41 causes the processor to display the list of registered user names, which are stored in the user environment setting database 132 by the new entry processing unit 103, on the display monitor, and prompt the user to input a desired user name with the mouse.

After the above step S41 is performed, the additional entry processing unit 105 at step S42 causes the processor to display the background image with the mesh pattern superimposed, which is stored in the user environment setting database 132 by the new entry processing unit 103, on the display monitor. The background image code, indicating the background image with the mesh pattern displayed at the above step S42, is related to the input user name within the user environment setting database 132 as shown in FIG. 7B.

After the above step S42 is performed, the additional entry processing unit 105 at step S43 causes the processor to prompt the user to input an image password on the display monitor with the mouse, and receive positions of input image points and a sequence of the positions currently specified by the user. When the user clicks a specific point on the background image with the mesh pattern, a color or a dot pattern of the display monitor at the point changes. The positions of the input image points on the background image are given to the user in visual form, and the user can confirm the input image password on the display monitor.

After the above step S43 is performed, the additional entry processing unit 105 at step S44 causes the processor to determine whether the input image password, which has been obtained at the above step S43, accords with the registered image password which is stored in the secret key database 131 by the new entry processing unit 103. It is possible that the determination as to whether the input image password accords with the registered image password be made by comparing an encryption key, derived from the specified positions of the input image points and the specified sequence of the positions, with the encryption key read from the secret key database 131.

When the result of the above step S44 is affirmative, the additional entry processing unit 105 at step S45 causes the processor to decrypt the encrypted data of the secret key, read from the secret key database 131, into the plain data.

When the result of the above step S44 is negative, the additional entry processing unit 105 causes the processor to output an error message indicating that the input image password is invalid.

After the above step S45 is performed, the additional entry processing unit 105 at step S46 causes the processor to receive plain data of an additional secret key input by the user.

After the above step S46 is performed, the additional entry processing unit 105 at step S47 causes the processor to generate encrypted data of the input secret key based on the encryption key which has been obtained for the existing secret key by the new entry processing unit 103. In the present embodiment, at the above step S47, the DES algorithm is used to generate encrypted data of the input secret key based on the encryption key.

After the above step S47 is performed, the additional entry processing unit 105 at step S48 causes the processor to store the encrypted data of the secret key, which has been obtained at the above step S47, in the secret key database 131 of the system 100.

After the above step S48 is performed, the additional entry processing unit 105 at step S49 causes the processor to store the user environment setting, which has been received at the above steps S41–S48, in the user environment setting database 132 of the system 100.

FIG. 10 shows the contents of the secret key database 311 in the secret data management system 100 after the additional entry processing of FIG. 9 is performed.

As shown in FIG. 10, after the additional entry processing of FIG. 9 is performed, an additional secret key B for the user name and the cipher code, which are the same as the user name and the cipher code related to the existing secret key A, is stored in the secret key database 311. According to the performance of the additional entry processing of FIG. 9, it is possible that a plurality of secret keys for a single image password be registered into the secret key database 311.

As shown in FIG. 10, an additional previous access address for the secret key B, which is different from the previous access address for the secret key A, is stored in the secret key database 311. The secret data management apparatus of the present embodiment can transmit the secret key to a different destination communication service for one of the secret keys A and B. Further, if an additional data item is stored in the secret key database 131 and the user environment setting database 132, it is possible for the secret data management apparatus and method of the present embodiment to provide an additional communication service for the user.

Figure 11:
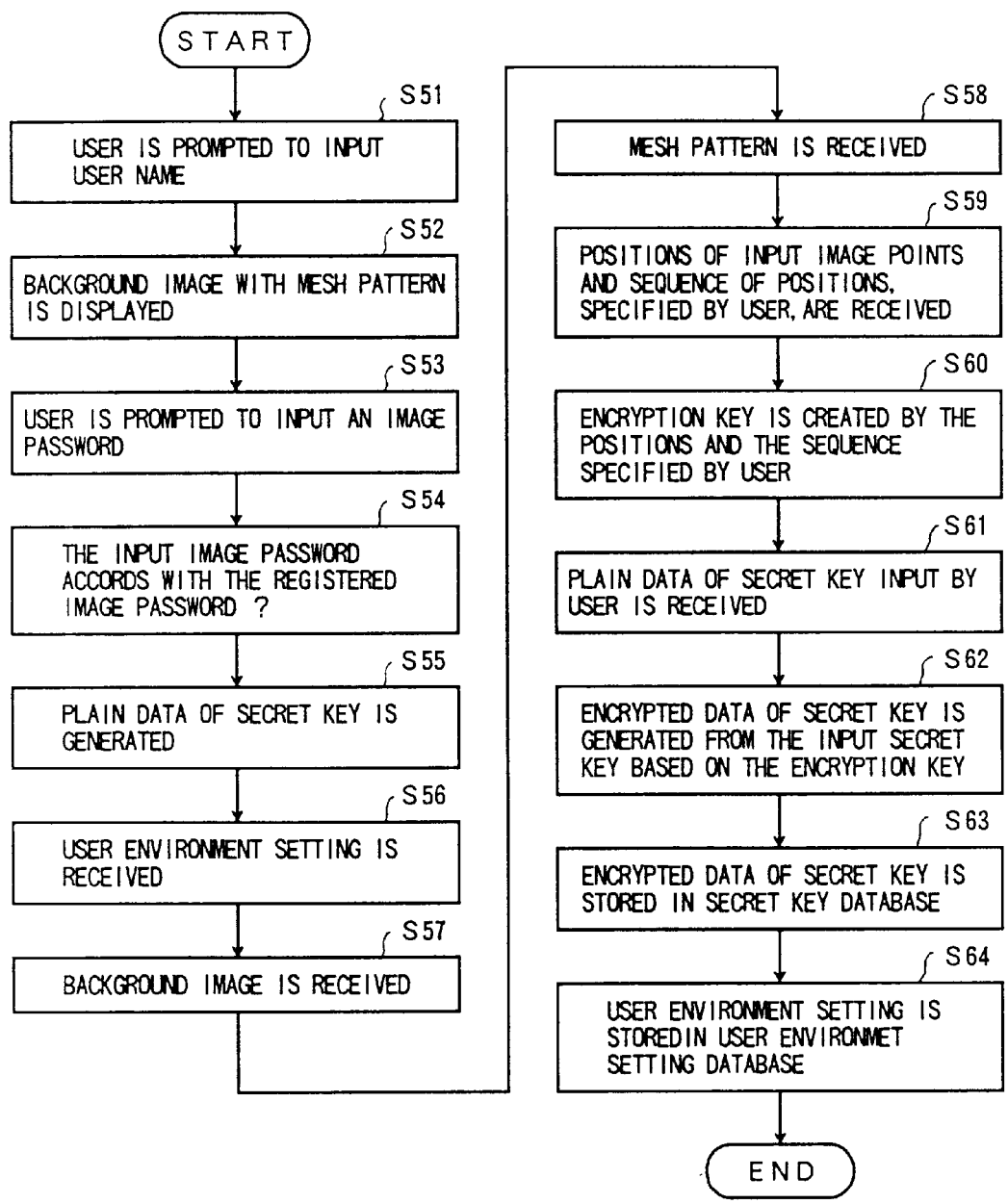
FIG. 11 is a flowchart for explaining an entry update processing performed by the secret data management apparatus of FIG. 5.

FIG. 11 shows an entry update processing performed by the secret data management apparatus of FIG. 5.

In the present embodiment, an entry update processing program related to the flowchart of FIG. 11 (which will be described later) is program code instructions stored in the memory of the secret data management system 100. The memory corresponds to a computer readable medium in the claims. The computer readable medium includes any instruction storage device, such as for examples, magnetic disks including floppy disks, optical disks including CD-ROMs, magneto-optical disks including MOs, semiconductor memory cards such as IC cards and miniature cards and other types of computer usable devices and media.

In the present embodiment, the memory of the secret data management system 100 may store encoded or non-encoded instructions. The instructions may be installed from a floppy disk (or a CD-ROM) to the hard disk drive of the secret data management system 100 first, transferred to the RAM of the system 100 and then read by the processor of the system 100. The memory of the secret data management system 100 may store either all or a part of the instructions related to the flowchart of FIG. 11.

During the entry update processing of FIG. 11, an updating of an existing secret key entry in the secret key database 131 is carried out by the image password user.

At the start of the entry update processing of FIG. 11, the entry update processing unit 106 at step S51 causes the processor to display the list of registered user names, which are stored in the user environment setting database 132 by the new entry processing unit 103, on the display monitor, and prompt the user to input a desired user name with the mouse.

After the above step S51 is performed, the entry update processing unit 106 at step S52 causes the processor to display the background image with the mesh pattern superimposed, which is stored in the user environment setting database 132 by the new entry processing unit 103, on the display monitor. The background image code, indicating the background image with the mesh pattern displayed at the above step S52, is related to the input user name within the user environment setting database 132.

After the above step S52 is performed, the entry update processing unit 106 at step S53 causes the processor to prompt the user to input an image password on the display monitor with the mouse, and receive positions of input image points and a sequence of the positions currently specified by the user. When the user clicks a specific point on the background image with the mesh pattern, a color or a dot pattern of the display monitor at the point changes. The positions of the input image points on the background image are given to the user in visual form, and the user can confirm the input image password on the display monitor.

After the above step S53 is performed, the entry update processing unit 106 at step S54 causes the processor to determine whether the input image password, which has been obtained at the above step S53, accords with the registered image password which is stored in the secret key database 131 by the new entry processing unit 103.

When the result of the above step S54 is affirmative, the entry update processing unit 106 at step S55 causes the processor to decrypt the encrypted data of the secret key, read from the secret key database 131, into the plain data.

When the result of the above step S54 is negative, the entry update processing unit 106 causes the processor to output an error message indicating that the input image password is invalid.

During the entry update processing of FIG. 11, the following steps S56–S64 are performed by the entry update processing unit 106 for only the image password user who has been successfully authenticated at the above steps S54 and S55.

After the above step S55 is performed, the entry update processing unit 106 at step S56 causes the processor to receive a user environment setting for the secret data management system 100 input by the user on the display monitor using the mouse. The environment setting input by the user includes a user name, a used browser, and a browser link option.

After the above step S56 is performed, the entry update processing unit 106 at step S57 causes the processor to receive a background image input by the user. The input background image is displayed on the display monitor after the above step S57 is performed during the entry update processing.

After the above step S57 is performed, the entry update processing unit 106 at step S58 causes the processor to receive a mesh pattern input by the user. The input mesh pattern is superimposed on the background image on the display monitor during a subsequent processing of the entry update processing unit 106.

After the above step S58 is performed, the entry update processing unit 106 at step S59 causes the processor to receive positions of input image points and a sequence of the positions newly specified by the user (or an updated image password). The background image on which the mesh pattern is superimposed is displayed on the display monitor, and the user newly specifies the positions of the input image points on the background image by using the mouse.

After the above step S59 is performed, the entry update processing unit 106 at step S60 causes the processor to create an encryption key based on the specified positions of the input image points and the specified sequence of the positions, which have been obtained at the above step S59. The encryption key obtained at the above step S60 is a specific numerical value, and the numerical value of the encryption key is calculated based on the specified positions and the specified sequence obtained at the above step S59.

After the above step S60 is performed, the entry update processing unit 106 at step S61 causes the processor to receive plain data of a secret key input by the user. In the present embodiment, an IC card in which the plain data of the input secret key is stored may be inserted in the system 100 in order to input the plain data of the secret key to the system 100.

After the above step S61 is performed, the entry update processing unit 106 at step S62 causes the processor to generate encrypted data of the input secret key based on the encryption key which has been obtained at the above step S60. In the present embodiment, at the above step S62, the DES algorithm is used to generate encrypted data of the input secret key based on the encryption key.

After the above step S62 is performed, the entry update processing unit 106 at step S63 causes the processor to store the encrypted data of the secret key, which has been obtained at the above step S62, in the secret key database 131 of the system 100. In the secret key database 131, the registered updated image password (or the positions of the input image points and the sequence of the positions specified by the user with respect to the corresponding encryption key for the secret key) is stored in connection with the encrypted data of the secret key.

After the above step S63 is performed, the entry update processing unit 106 at step S64 causes the processor to store the user environment setting, which has been received at the above steps S56–S63, in the user environment setting database 132 of the system 100.

Next, a description will be given of various display screens provided for the user by the secret data management system 100 of the present embodiment with reference to FIGS. 12–22.

FIG. 12 shows a display screen provided by the secret data management apparatus of FIG. 5 at a user environment setting step. This display screen corresponds to the step S 21 of FIG. 6 or the step S56 of FIG. 11.

As shown in FIG. 12, the user inputs the user environment setting for the secret data management system 100 on the display monitor using the mouse or the keyboard. The environment setting input by the user includes a user name, a used browser, and a browser link option. When the browser link option is used, a secret key is transmitted through the browser to a destination communication service. When a display monitor choice is used, the whole processing is performed on the display monitor only.

Figure 13:
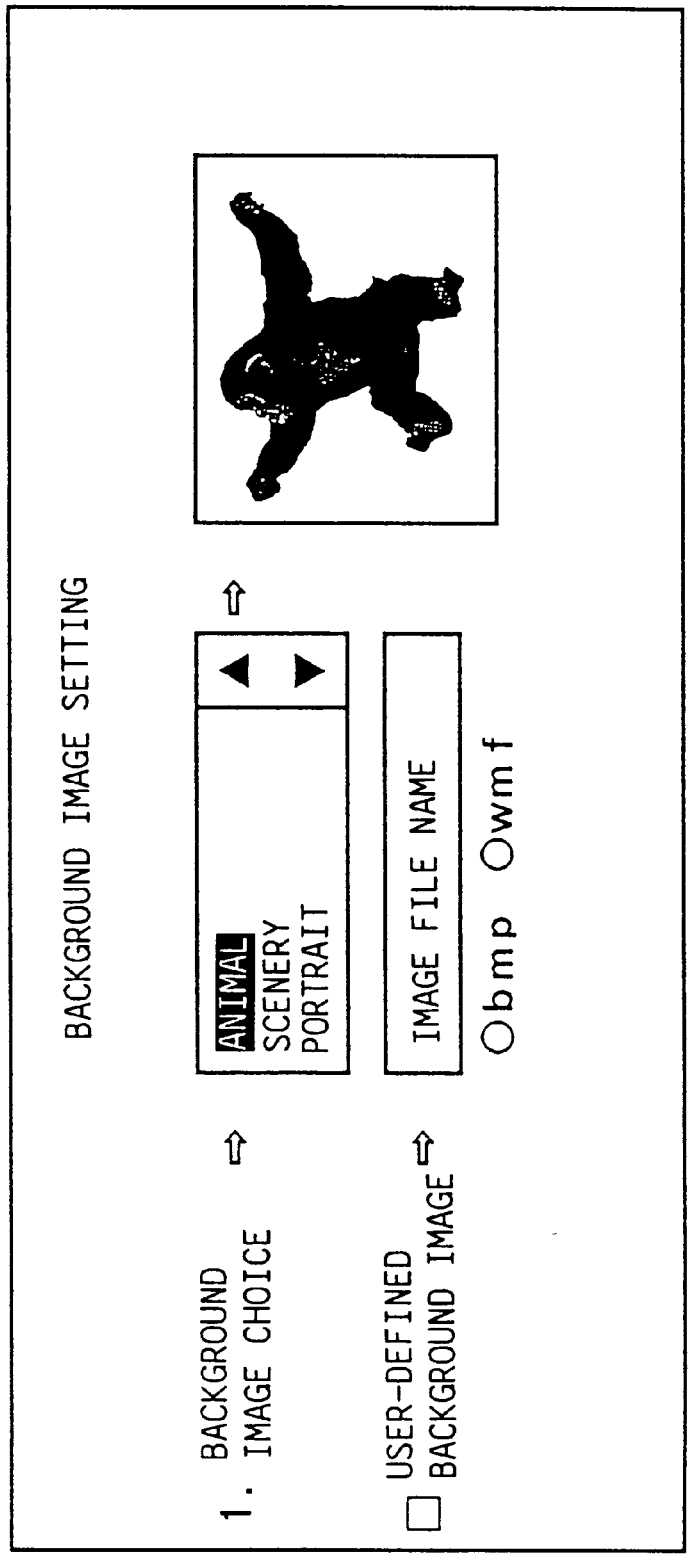
FIG. 13 is a diagram for explaining a display screen of the secret data management apparatus of FIG. 5 at a background image setting step.

FIG. 13 shows a display screen provided by the secret data management apparatus of FIG. 5 at a background image setting step. This display screen corresponds to the step S22 of FIG. 6 or the step S57 of FIG. 11.

As shown in FIG. 13, the user selects one of the registered background images, the user-defined background image and another background image transferred from an external image storage medium, by using the mouse. After a desired background image choice is input by the user, the input background image is displayed in a box of the display screen as shown in FIG. 13.

Figure 14:
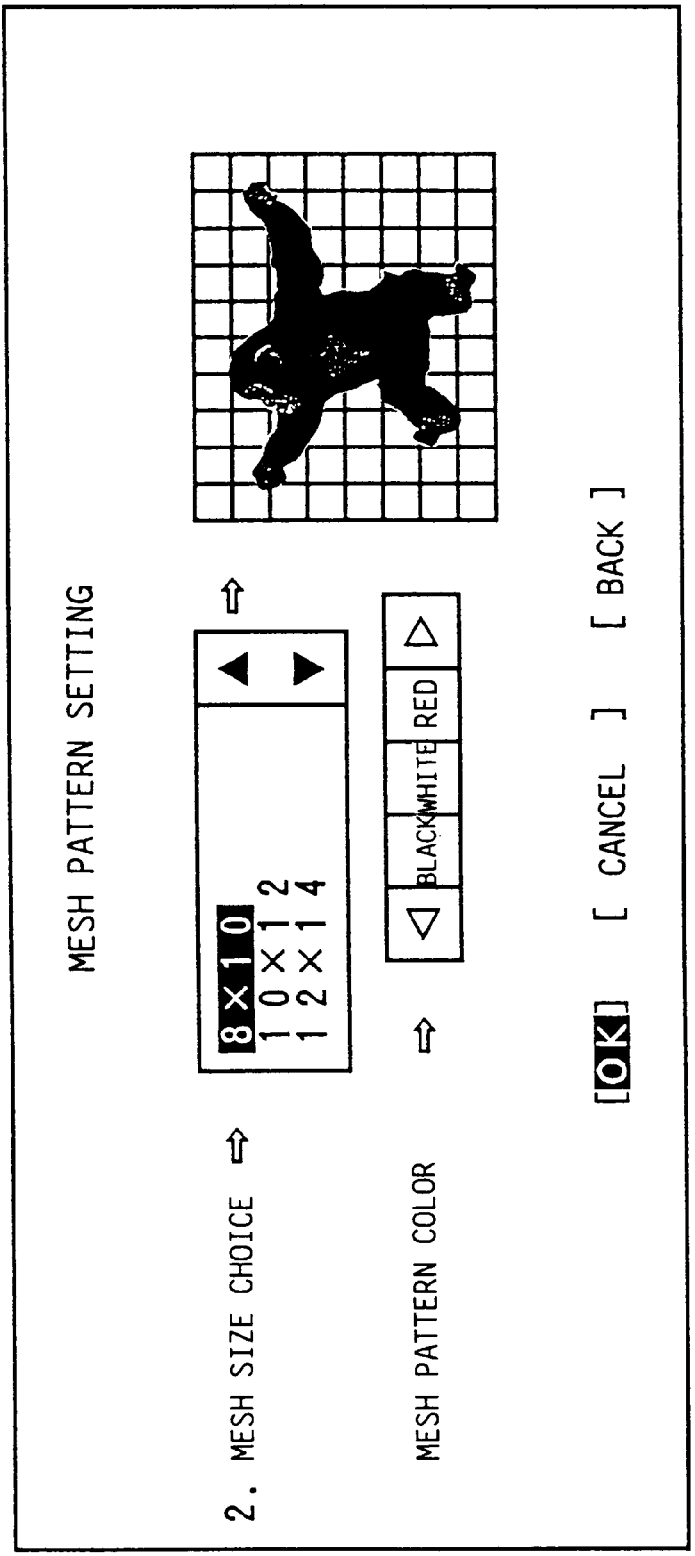
FIG. 14 is a diagram for explaining a display screen of the secret data management apparatus of FIG. 5 at a mesh pattern setting step.

FIG. 14 shows a display screen provided by the secret data management apparatus of FIG. 5 at a mesh pattern setting step. This display screen corresponds to the step S23 of FIG. 6 or the step S58 of FIG. 11.

As shown in FIG. 14, the user selects one of a number of registered mesh sizes and one of registered mesh pattern colors. When desired mesh pattern choices are input by the user, the input mesh pattern is superimposed on the input background image in the box of the display screen as shown in FIG. 14. The user can confirm that the desired mesh pattern is selected in the secret data management system 100.

Figure 15:
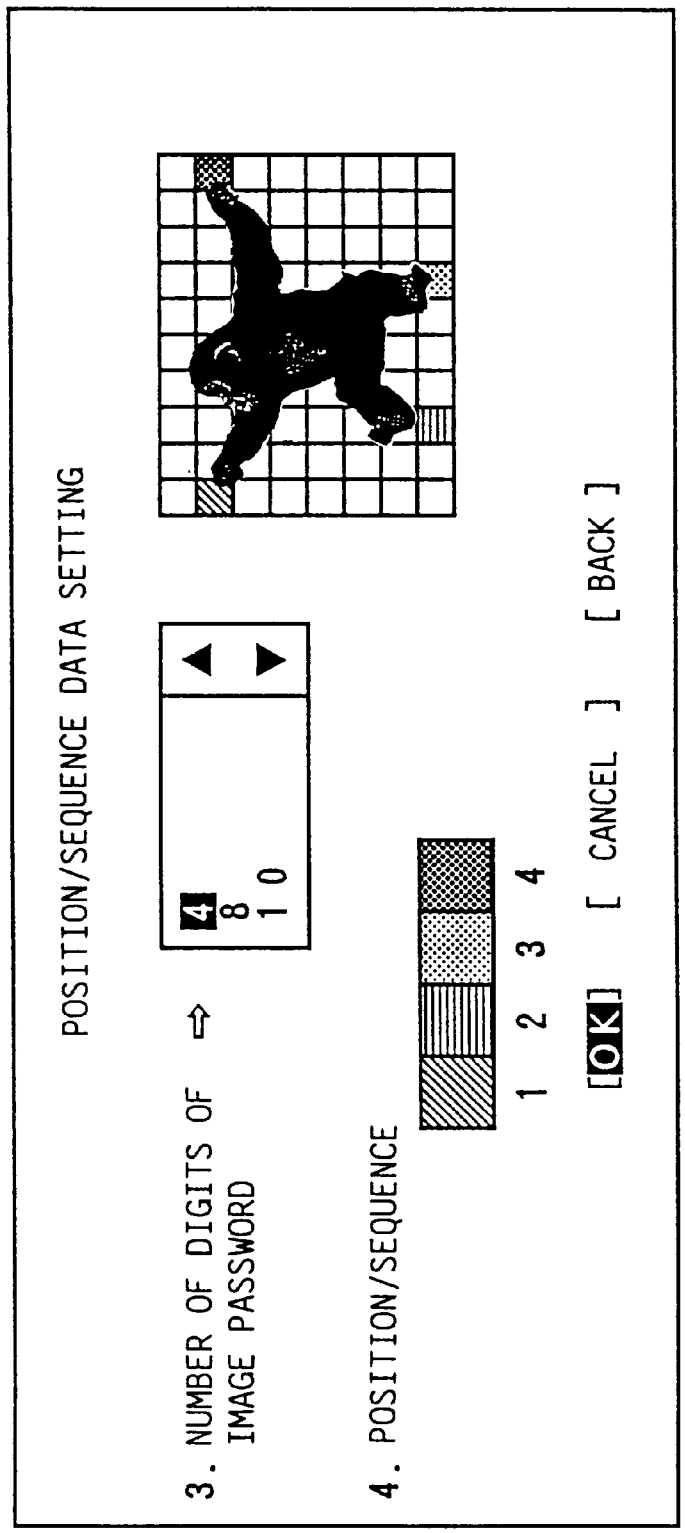
FIG. 15 is a diagram for explaining a display screen of the secret data management apparatus of FIG. 5 at a position/sequence data setting step.

FIG. 15 shows a display screen provided by the secret data management apparatus of FIG. 5 at a position/sequence data setting step. This display screen corresponds to the step S23 of FIG. 6 or the step S58 of FIG. 11.

As shown in FIG. 15, by using the mouse, the user selects one of a plurality of registered numbers of digits of the input image password, and specifies positions of input image points and a sequence of the positions on the background image with the mesh pattern displayed on the display monitor. The number of the positions which the user can specify depends on the selected number of digits of the input image password. If the number of the positions specified by the user exceeds the selected number of digits, an error message is output. If the number of the positions specified by the user is less than the selected number of digits and an OK button is clicked, an error message is output which prompts the user to specify all the input image points on the background image.

When a specific point on the background image in the box of the display screen is clicked by the user, a color or a dot pattern of the display monitor at the point within the background image changes. The positions of the input image points specified by the user on the background image are given to the user in visual form. Further, in the display screen of FIG. 15, the sequence of the positions specified by the user is indicated by a row of small boxes having different dot patterns, which correspond to the dot patterns of the display monitor at the input image points on the background image. Therefore, the user can confirm the specified positions of the input image points and the specified sequence of the positions (or the input image password) on the display monitor.

Figure 16:
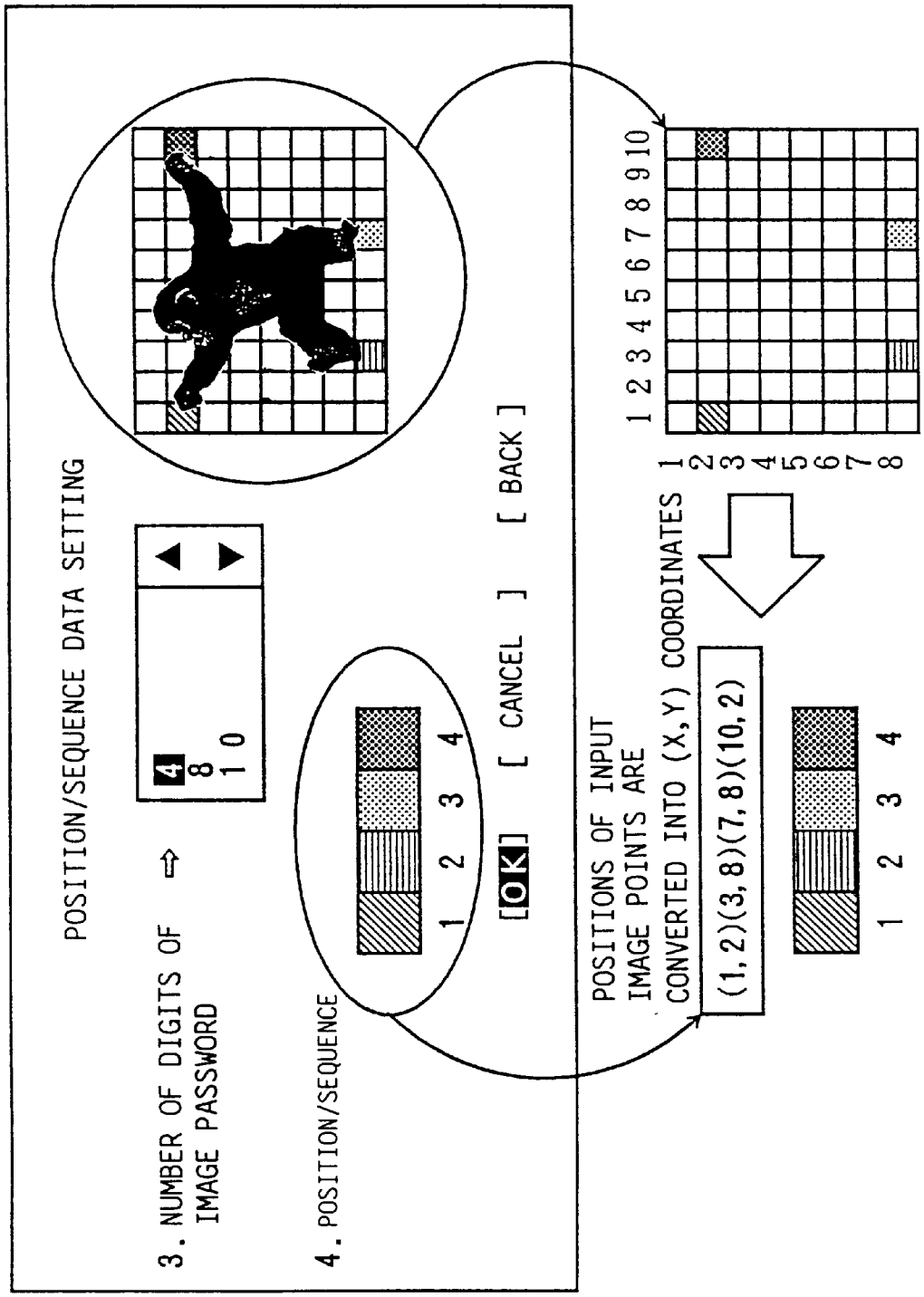
FIG. 16 is a diagram for explaining a configuration of an encryption key generating unit in the secret data management apparatus of FIG. 5.

FIG. 16 is a diagram for explaining a configuration of the encryption key generating unit 115 of the secret data management apparatus of FIG. 5. The configuration of the encryption key generating unit 115 will now be described with reference to FIG. 16.

In the example of FIG. 16, the number of digits of the image password is set at 4, and the mesh pattern is provided in a 8×10 matrix formation. That is, the background image consists of a matrix of image points with 8 rows and 10 columns, and the positions of the four input image points and the sequence of the positions are specified as shown in FIG. 16.

As shown in FIG. 16, a (x, y) coordinate system is defined for the background image of the present example. The position of the image point at the left uppermost corner of the background image is defined by (1, 1), and the position of the image point at the right uppermost corner of the background image is defined by (10, 1). Suppose that the four input image points on the background image are clicked by the user in the specified sequence. The encryption key created by the encryption key generating unit 115 of the present embodiment in this example is indicated by the specified sequence of the four (x, y) coordinates: (1, 2), (3, 8), (7, 8) and (10, 2).

In the present embodiment, the encryption unit 117 generates encrypted data of the input secret key based on the specified sequence of the (x, y) coordinates in accordance with the DES algorithm. The DES algorithm performs a one-to-one numerical letter substitution of the input secret key according to the specified sequence of the (x, y) coordinates. First, the numerical letter of the y-coordinate is substituted for the numerical letter of the x-coordinate. Second, the numerical letter of the x-coordinate is substituted for the numerical letter of the y-coordinate. And the two substitution procedures are alternately repeated in accordance with the specified sequence.

In the example of FIG. 16, the encryption of the input secret key to generate encrypted data of the input secret key is carried out by the encryption unit 117 of the present embodiment as follows.

Suppose that the input secret key is 1234. The specified sequence of the four (x, y) coordinates are given as (1, 2), (3, 8), (7, 8) and (10, 2). As the first input point is indicated by (1, 2), the letter "2" is substituted for the letter "1". As the second input point is indicated by (3, 8), the letter "3" is substituted for the letter "8". However, the input secret key does not include the letter "8" and no substitution is performed. As the third input point is indicated by (7, 8), the letter "8" is substituted for the letter "7". However, the input secret key does not include the letter "7" and no substitution is performed. As the fourth input point is indicated by (10, 2), the letter "0" is substituted for the letter "2".

Consequently, the above encryption is performed as follows.

| input secret key: | 1234 |
|---|---|
| (1, 2): | 2234 |
| (3, 8): | 2234 |
| (7, 8): | 2234 |
| (10, 2): | 0034 |

According to the above-described encryption algorithm, the length of the encrypted data is the same as the length of the input secret key, and the lengths of secret key data before and after the encryption is performed remain unchanged.

Further, in the present embodiment, the decryption to generate the plain data of the secret key from the encrypted data of the secret key is performed by the decryption unit 125 by adding a cipher code to the encrypted data. As described above, the cipher code is calculated as the difference between the plain data of the secret key and the encrypted data of the secret key. In the example of FIG. 16, the cipher code is calculated as in the formula 1200=1234 –0034. Therefore, the decryption to generate the plain data (1234) from the cipher data (0034) in this example is performed by the decryption unit 125 by adding 1200 to 0034.

FIG. 17 shows a display screen provided by the secret data management apparatus of FIG. 5 at an encryption key generating step. This display screen corresponds to the step S25 of FIG. 6 or the step S60 of FIG. 11.

As shown in FIG. 17, after the above steps S21–S24 of FIG. 6 or the above steps S56–S59 are successfully performed, the user is notified on the display monitor by the secret data management system 100 that an encryption key, intrinsic to the user, is created by the positions of the input image points and the sequence of the positions specified by the user.

FIG. 18 shows a display screen provided by the secret data management apparatus of FIG. 5 at a secret key setting step. This display screen corresponds to the step S26 of FIG. 6 or the step S61 of FIG. 11.

As shown in FIG. 18, the user is prompted to select one of a plurality of secret key input methods on the display screen. The plurality of secret key input methods include: (1) a secret key input by an IC card; (2) a secret key input by a file transfer; and (3) a secret key input by a keyboard. After the user selects the input method and presses the OK button, the plain data of the secret key input by the user is received by the system 100.

FIG. 19 shows a display screen provided by the secret data management apparatus of FIG. 5 at a registered user name setting step. This display screen corresponds to the step S31 of FIG. 8.

During the image password processing of FIG. 8, an authentication of the user for the image password is carried out by the user on the display monitor by using only the mouse. The secret data management apparatus of the present embodiment can provide increased operability for the user and adequate security for the secret information.

As shown in FIG. 19, at the registered user name setting step, the user is prompted to select one of the registered user names in the user name list on the display monitor.

FIG. 20 shows a display screen provided by the secret data management apparatus of FIG. 5 at a background/pattern display step. This display screen corresponds to the steps S32 and S33 of FIG. 8.

As shown in FIG. 20, the background image with the mesh pattern previously set by the user is displayed on the display monitor. In the example of FIG. 20, the user may select one of a mesh pattern display option ("ON") and a mesh pattern non-display option ("OFF"). At the image password reception step, the user is prompted to specify the positions of the input image points on the background image and the sequence of the positions by using the mouse. After the user presses the OK button, the positions of the input image points and the sequence of the positions specified by the user are received by the system 100.

FIG. 21 shows a display screen provided by the secret data management apparatus of FIG. 5 at an image password reception step. This display screen corresponds to the step S34 of FIG. 8.

As shown in FIG. 21, when the result of the step S34 is affirmative, the user is notified by the system 100 on the display monitor that the image password input by the user is accepted by the system 100. Further, the user is prompted to select one of a plurality of secret key transmission methods on the display monitor by using the mouse. The plurality of secret key transmission methods include: (1) a transmission of the secret key data by the browser; (2) a transfer of the secret key data to the display monitor; and (3) a transfer of the secret key data to a file within the storage medium of the system 100. After the user selects the secret key transmission method and presses the OK button, the plain data of the secret key from the system 100 is transmitted according to the selected method.

FIG. 22A and FIG. 22B show display screens provided by a browser when the browser link option is used.

The display screen of FIG. 22A is provided by the browser after the authentication of the user for the image password is carried out. It is supposed that the browser link option is used. When a digital signature button in the display screen is clicked, the user is prompted to input a destination to which the secret key data is transmitted. The secret key data transmitted by the browser is stored into the destination input by the user.

When the secret key specified by the user is not used before, the image password processing which is placed into an icon of the display screen is started. The display screen of FIG. 22B is provided by the browser in such a case. In the display screen of FIG. 22B, the user is prompted to select one of the secret keys issued from a plurality of certificate authorities and owned by the user, as being the secret key that the user want to currently use.

After the data of the selected secret key in the display screen of FIG. 22B is transmitted to the destination, the previous access address for the corresponding secret key stored in the secret key database 131 is updated such that the address of the related destination communication service in connection with the secret key is modified. Further, a data item of the related certificate authority may be added to the secret key database 131. According to this modification, the secret data management apparatus of the present embodiment can provide increased operability for the user and adequate security for the secret information. It is not necessary for the user to memorize both the secret key and the related certificate authority for each communication service.

Further, the present invention is not limited to the above-described embodiment, and variations and modifications may be made without departing from the scope of the present invention.

What is claimed is:

1. A secret data management apparatus controlling a secret key so that the secret key is kept confidential, the secret data management apparatus comprising:

an image display unit displaying an image on a display monitor, the displayed image having a matrix of image points arrayed in rows and columns on the display monitor;

a position/sequence input unit inputting first positions of input image points, specified on the displayed image by an input device, and a sequence of the first positions, the first positions and the sequence thereof describing a password;

an encryption unit generating encrypted data of the secret key based on the first positions and the sequence thereof inputted by the position/sequence input unit;

a secret data storage unit storing the encrypted data of the secret key generated by the encryption unit, into a storage medium;

an access allowance unit allowing access to the secret key stored in the storage medium when second positions of input image points on the image and a sequence of the second positions, subsequently specified by the input device at a time of the access, match with the first positions and the sequence thereof; and a decryption unit generating plain data of the secret key from the encrypted data stored in the storage medium when the access is allowed by the access allowance unit, the plain data indicating the password.

2. The secret data management apparatus according to claim 1, wherein said encryption unit comprises:

an encryption key generating unit generating an encryption key based on the first positions and the sequence from the position/sequence input unit; and a secret key encryption unit generating encrypted data of the secret key based on the encryption key from the encryption key generating unit.

3. The secret data management apparatus according to claim 2, wherein said encryption key generating unit calculates a value of the encryption key based on the first positions and the sequence from the position/sequence input unit, and wherein said secret key encryption unit performs a one-to-one letter substitution of the input secret key according to the calculated value from the encryption key generating unit.

4. The secret data management apparatus according to claim 1, wherein said image display unit displays as the matrix a mesh pattern superimposed on the image on the display monitor, said mesh pattern having a selectable mesh size and a selectable mesh pattern color.

5. A secret data management apparatus controlling a secret key issued by a certificate authority so that the secret key is kept confidential, the secret data management apparatus comprising:

an image display unit displaying an image on a display monitor, the displayed image having a matrix of image points arrayed in rows and columns on the display monitor;

a position/sequence input unit inputting first positions of input image points, specified on the displayed image by an input device, and a sequence of the first positions specified, the first positions and the sequence thereof describing a password;

an encryption unit generating encrypted data of the secret key based on the first positions and the sequence thereof inputted by the position/sequence input unit;

a secret data storage unit storing the encrypted data of the secret key generated by the encryption unit, into a first storage medium;

an access allowance unit allowing access to the secret key stored in the first storage medium when second positions of input image points on the image and a sequence of the second positions, subsequently specified by the input device at a time of the access, match with the first positions and the sequence thereof; and a decryption unit generating plain data of the secret key from the encrypted data stored in the first storage medium when the access is allowed by the access allowance unit, the plain data indicating the password.

6. The secret data management apparatus according to claim 5, wherein said encryption unit comprises:

an encryption key generating unit generating an encryption key based on the first positions and the sequence from the position/sequence input unit; and a secret key encryption unit generating encrypted data of the secret key based on the encryption key from the encryption key generating unit.

7. The secret data management apparatus according to claim 6, wherein said encryption key generating unit calculates a value of the encryption key based on the first positions and the sequence from the position/sequence input unit, and wherein said secret key encryption unit performs a one-to-one letter substitution of the secret key from the certificate authority according to the calculated value from the encryption key generating unit.

8. The secret data management apparatus according to claim 5, wherein said image display unit displays a registered image on the display monitor.

9. The secret data management apparatus according to claim 5, wherein said image display unit displays a user-defined image on the display monitor.

10. The secret data management apparatus according to claim 9, wherein said image display unit displays a user-defined image, transferred from a second storage medium, on the display monitor, said second storage medium being separated from the first storage medium.

11. The secret data management apparatus according to claim 5, further comprising:

a mesh pattern display unit displaying as the matrix a mesh pattern superimposed on the image on the display monitor, said mesh pattern having a selectable mesh size and a selectable mesh pattern color.

12. The secret data management apparatus according to claim 5, wherein said encryption unit generates encrypted data of plural secret keys when identical first positions of input image points on the image and an identical sequence of the first positions are specified using the input device and input by the position/sequence input unit, and wherein said access allowance unit allows access to said plural secret keys when the identical first positions and the identical sequence are subsequently specified using the input device at a time of the access.

13. The secret data management apparatus according to claim 5, further comprising a second input unit inputting user data and user environment data specified by a user, wherein said secret data storage unit stores the user data and the user environment data in the first storage medium in addition to the encrypted data of the secret key.

14. The secret data management apparatus according to claim 13, wherein said access allowance unit comprises:

an accessibility judgment unit determining whether first positions of input image points on the image and a sequence of the first positions, subsequently specified using the input device at a time of the access, match with the first positions and the sequence from the position/sequence input unit; and a secret key selection unit reading the user data and the user environment data, in addition to the encrypted data of the secret key, from the first storage medium when the access to the secret key is allowed.

15. A method of controlling a secret key issued by a certificate authority so that the secret key is kept confidential, the method comprising:

inputting user data and user environment data;

setting an image to be displayed on a display monitor;

displaying the image on the display monitor, the displayed image having a matrix of image points arrayed in rows and columns on the display monitor;

inputting first positions of input image points, specified on the displayed image by an input device, and a sequence of the first positions specified, the first positions and the sequence thereof describing a password;

generating an encryption key based on the first positions and the sequence thereof specified;

generating encrypted data of the secret key based on the encryption key; and storing the encrypted data of the secret key, the user data and the user environment data, into a storage medium, wherein the encrypted data, the user data and the user environment data are related to each other and registered in the storage medium.

16. The method according to claim 15, further comprising:

inputting the user data subsequently specified by the user;

displaying the image on the display monitor and inputting first positions of input image points on the displayed image subsequently specified by the user and a sequence of the positions first subsequently specified by the user;

determining whether the subsequently specified first positions and sequence match with the previously specified first positions and sequence;

generating plain data of the secret key from the encrypted data stored in the storage medium and related to the user data and allowing access to the secret key in accordance with the user environment data related to the secret key when said determining step yields the match; and inhibiting the access to the secret key when said determining step does not yield the match.

17. A computer readable medium storing program code causing a processor to execute a secret data processing which controls a secret key issued by a certificate authority so that the secret key is kept confidential in a secret data management apparatus, comprising:

first program code means for causing the processor to display an image on a display monitor, the displayed image having a matrix of image points arrayed in rows and columns on the display monitor;

second program code means for causing the processor to input first positions of input image points, specified on the displayed image by an input device, and a sequence of the first positions specified, the first positions and the sequence thereof describing a password;

third program code means for causing the processor to generate encrypted data of the secret key based on the first positions and the sequence;

fourth program code means for causing the processor to store the encrypted data of the secret key generated by the third program code means, into a first storage medium;

fifth program code means for causing the processor to allow access to the secret key stored in the first storage medium when second positions of input image points on the image and a sequence of the second positions, subsequently specified by the input device at a time of the access, match with the first positions and the sequence thereof; and sixth program code means for causing the processor to generate plain data of the secret key from the encrypted data stored in the first storage medium when the access is allowed, the plain data indicating the password.

18. The computer readable medium according to claim 17, wherein said third program code means comprises:

seventh program code means for causing the processor to generate an encryption key based on the first positions and the sequence from the second program code means; and eighth program code means for causing the processor to generate encrypted data of the secret key based on the encryption key from the seventh program code means.

19. The computer readable medium according to claim 18, wherein said seventh program code means causes the processor to calculate a value of the encryption key based on the first positions and the sequence from the second program code means, and wherein said eighth program code means causes the processor to perform a one-to-one letter substitution of the secret key from the certificate authority according to the calculated value from the seventh program code means.

20. The computer readable medium according to claim 17, wherein said first program code means causes the processor to display a registered image on the display monitor.

21. The computer readable medium according to claim 17, wherein said first program code means causes the processor to display a user-defined image on the display monitor.

22. The computer readable medium according to claim 21, wherein said first program code means causes the processor to display a user-defined image, transferred from a second storage medium, on the display monitor, said second storage medium being separated from the first storage medium.

23. The computer readable medium according to claim 17, further comprising:

ninth program code means for causing the processor to display as the matrix a mesh pattern superimposed on the image on the display monitor, said mesh pattern having a selectable mesh size and a selectable mesh pattern color.

24. The computer readable medium according to claim 17, wherein said third program code means causes the processor to generate encrypted data of plural secret keys when identical first positions of input image points on the image and an identical sequence of the first positions are specified using the input device and input, and wherein said fifth program code means causes the processor to allow access to said plural secret keys when the identical first positions and the identical sequence are subsequently specified using the input device at a time of the access.

25. The computer readable medium according to claim 17, further comprising tenth program code means for causing the processor to input user data and user environment data specified by a user, wherein said fourth program code means causes the processor to store the user data and the user environment data in the first storage medium in addition to the encrypted data of the secret key.

26. The computer readable medium according to claim 25, wherein said fifth program code means comprises:

eleventh program code means for causing the processor to determine whether first positions of input image points on the image and a sequence of the first positions, subsequently specified using the input device at a time of the access, match with the first positions and the sequence from the second program code means; and twelfth program code means for causing the processor to read the user data and the user environment data, in addition to the encrypted data of the secret key, from the first storage medium when the access to the secret key is allowed.

27. A secret data management apparatus encrypting a secret key using an image displayed by a display unit, comprising:

a position/sequence input unit inputting positions of image points of the displayed image using a matrix of image points representing the displayed image and inputting a sequence of the positions; and an encryption unit encrypting the secret key using the input positions and the sequence of the positions.

* * * * *